United States Patent
Hyatt et al.

(10) Patent No.: US 10,960,493 B2
(45) Date of Patent: Mar. 30, 2021

(54) MACHINE TOOL SYSTEM AND METHOD FOR ADDITIVE MANUFACTURING

(71) Applicant: DMG Mori USA, Hoffman Estates, IL (US)

(72) Inventors: Gregory A. Hyatt, South Barrington, IL (US); Gideon N. Levy, Hoffman Estates, IL (US); Makoto Fujishima, Hoffman Estates, IL (US); Michael J. Panzarella, Hoffman Estates, IL (US); Masahiko Mori, Hoffman Estates, IL (US)

(73) Assignee: DMG Mori USA, Hoffman Estates, IL (US)

( * ) Notice: Subject to any disclaimer, the term of this patent is extended or adjusted under 35 U.S.C. 154(b) by 1034 days.

(21) Appl. No.: 14/937,993

(22) Filed: Nov. 11, 2015

(65) Prior Publication Data
US 2016/0129528 A1 May 12, 2016

Related U.S. Application Data

(60) Provisional application No. 62/078,001, filed on Nov. 11, 2014.

(51) Int. Cl.
| | |
|---|---|
| *B23K 26/342* | (2014.01) |
| *B23K 26/08* | (2014.01) |
| *B29C 64/147* | (2017.01) |
| *B33Y 10/00* | (2015.01) |
| *B33Y 30/00* | (2015.01) |
| *B29C 64/153* | (2017.01) |

(52) U.S. Cl.
CPC ........ *B23K 26/342* (2015.10); *B23K 26/0884* (2013.01); *B29C 64/147* (2017.08); *B29C 64/153* (2017.08); *B33Y 10/00* (2014.12); *B33Y 30/00* (2014.12)

(58) Field of Classification Search
CPC .................................................. B29C 64/223
USPC ....................................................... 219/76.12
See application file for complete search history.

(56) References Cited

U.S. PATENT DOCUMENTS

| | | | | |
|---|---|---|---|---|
| 4,752,352 A | * | 6/1988 | Feygin ................. | B23K 26/083 156/154 |
| 5,192,559 A | * | 3/1993 | Hull ...................... | B33Y 70/00 425/89 |
| 5,368,085 A | * | 11/1994 | Ruparelia ............... | E06B 3/285 160/180 |

(Continued)

OTHER PUBLICATIONS

Office Action for related Japanese Application No. 2015-221113; report dated Dec. 3, 2019.

*Primary Examiner* — Ibrahime A Abraham
*Assistant Examiner* — Elizabeth M Sims
(74) *Attorney, Agent, or Firm* — Miller, Matthias & Hull LLP

(57) ABSTRACT

A machine for additive manufacturing positions a film having additive material relative to a substrate. The additive material is melted onto the substrate or previously formed layers of a workpiece using a laser. The substrate/workpiece and/or the film can be positioned in multiple axes so that complex shapes can be formed without extraneous supporting structures. The film-based delivery of the additive material allows deposition in orientations other than horizontal as is required for powder-only additive manufacturing and also avoids the inconvenience of collecting and recycling unused loose powdered metal.

19 Claims, 21 Drawing Sheets

(56) References Cited

U.S. PATENT DOCUMENTS

| | | | | |
|---|---|---|---|---|
| 5,607,540 | A * | 3/1997 | Onishi | B29C 64/141 |
| | | | | 156/379.8 |
| 5,876,550 | A * | 3/1999 | Feygin | B22C 9/00 |
| | | | | 156/264 |
| 6,575,218 | B1 * | 6/2003 | Burns | B32B 38/185 |
| | | | | 156/512 |
| 8,540,501 | B2 * | 9/2013 | Yasukochi | B33Y 30/00 |
| | | | | 425/89 |
| 2004/0224173 | A1 * | 11/2004 | Boyd | B29C 64/141 |
| | | | | 428/500 |
| 2010/0155374 | A1 | 6/2010 | Rabinovich | |
| 2012/0228807 | A1 * | 9/2012 | Teulet | B22F 3/1055 |
| | | | | 264/482 |
| 2013/0071577 | A1 * | 3/2013 | Yasukochi | B29C 39/148 |
| | | | | 427/521 |
| 2013/0186558 | A1 * | 7/2013 | Comb | G03G 15/169 |
| | | | | 156/277 |
| 2014/0170012 | A1 | 6/2014 | Delisle et al. | |
| 2015/0251351 | A1 * | 9/2015 | Feygin | B29C 64/188 |
| | | | | 156/267 |

* cited by examiner

MACHINE TOOL SYSTEM AND METHOD FOR ADDITIVE MANUFACTURING

BACKGROUND

Technical Field

The present disclosure generally relates to computed numerically controlled machine tools, and more particularly, to methods and apparatus using a captive additive material.

Description of the Related Art

Traditionally, materials are processed into desired shapes and assemblies through a combination of rough fabrication techniques (e.g., casting, rolling, forging, extrusion, and stamping) and finish fabrication techniques (e.g., machining, welding, soldering, polishing). To produce a complex assembly in final, usable form ("net shape"), a condition which requires not only the proper materials formed in the proper shapes, but also having the proper combination of metallurgical properties (e.g., various heat treatments, work hardening, complex microstructure), typically requires considerable investment in time, tools, and effort.

One or more of the rough and finish processes may be performed using Computer Numerically Controlled (CNC) machine tools. Such machine tools include lathes, milling machines, grinding machines, and other tool types. More recently, machining centers have been developed, which provide a single machine having multiple tool types and capable of performing multiple different machining processes. Machining centers may generally include one or more tool retainers, such as spindle retainers and turret retainers holding one or more tools, and a workpiece retainer, such as a pair of chucks. The workpiece retainer may be stationary or move (in translation and/or rotation) while a tool is brought into contact with the workpiece, thereby performing a subtractive manufacturing process during which material is removed from the workpiece.

Because of cost, expense, complexity, and other factors, more recently there has been interest in alternative techniques which would allow part or all of the conventional materials fabrication procedures to be replaced by additive manufacturing techniques. In contrast to subtractive manufacturing processes, which focus on precise removal of material from a workpiece, additive manufacturing processes precisely add material, typically in a computer-controlled environment. Additive manufacturing techniques may expand manufacturing capabilities such as by permitting seamless construction of complex configurations which, using conventional manufacturing techniques, would have to be assembled from a plurality of component parts. For the purposes of this specification and the appended claims, the term 'plurality' consistently is taken to mean "two or more." The opportunity for additive techniques to replace subtractive processes depends on several factors, such as the range of materials available for use in the additive processes, the size and surface finish that can be achieved using additive techniques, and the rate at which material can be added. Additive processes may advantageously be capable of fabricating complex precision net-shape components ready for use. In some cases, however, the additive process may generate "near-net shape" products that require some degree of finishing.

However, there are some shortcomings in some of the additive techniques, particularly those associated with powder-based processes. In some cases, as little as 5% of the powder deposited on the part being manufactured may actually be processed leaving 95% of the powder to be recovered and recycled. Many operators do not wish to handle their own recycling on site, requiring the cost and inconvenience of outside services. Because the powder is so fluid prior to application often support structures must be included in the design of even small overhangs or similar design features. These support structures must then be removed by post-processing using a mill or other tool. Also, because of the fluid nature of the powder it must be deposited on virtually horizontal surfaces in order to keep gravity from affecting the uniform thickness of the powder. The need to re-coat a work surface with new powder after each additive layer is added slows the process and exacerbates the amount of powder lost during the manufacturing of a part. Lastly, the deposition of powders and the inevitable powder 'dust' left after a project makes it difficult to quickly switch between alloys of different powders because of the cleaning required to prevent contamination of the new powder by remnants of the previous powder.

SUMMARY

In an aspect of the disclosure, a machine includes a controller, a work platform capable of moving in a plurality of dimensions responsive to instructions from the controller, and a laser proximate to the work platform that operates according to instructions from the controller. A film includes an additive material selected to melt when heated by the laser, wherein a workpiece attached to the work platform is formed by fusing successive layers of the additive material as a result of the additive material from each layer being melted via heating by the laser.

In another aspect of the disclosure, a method is provided of depositing an additive material to form a workpiece, the method including providing a film that includes the additive material, aligning a first portion of the film over the workpiece, heating a predetermined area of the first portion of the film causing the additive material at the predetermined area to melt onto the workpiece, and protecting the predetermined area from oxidation during the heating. A second portion of the film is aligned over the workpiece, and a second predetermined area of the second portion of the film is heated to cause the additive material at the second predetermined area to melt onto the workpiece.

In another aspect of the disclosure, a device includes a controller, a work platform movable in multiple-axes responsive to instructions from the controller, and a laser operated by the controller and moveable in at least two axes proximate to the work platform responsive to instructions from the controller. A film includes an additive material made of metal, and a transport assembly is configured to move an unused portion of the film to the work platform responsive to instructions from the controller, wherein a workpiece coupled to the work platform is formed by layers of the additive material successively deposited by melting the additive material with the laser.

In another aspect of the disclosure, which may be combined with any of the aspects identified herein, the film comprises a metal additive material provided as a foil.

In another aspect of the disclosure, which may be combined with any of the aspects identified herein, the film comprises a carrier coupled to the additive material, and the additive material is further selected to separate from the carrier when melted by the laser.

In another aspect of the disclosure, which may be combined with any of the aspects identified herein, the carrier comprises a sacrificial layer and the additive material is adhered to the sacrificial layer using one of an adhesive or a static charge.

In another aspect of the disclosure, which may be combined with any of the aspects identified herein, the carrier includes first and second sacrificial layers, and the additive material is disposed between the first and second sacrificial layers.

In another aspect of the disclosure, which may be combined with any of the aspects identified herein, the carrier further includes a third sacrificial layer, and a second additive material is disposed between the second and third sacrificial layers.

In another aspect of the disclosure, which may be combined with any of the aspects identified herein, the second additive material is different than the additive material.

In another aspect of the disclosure, which may be combined with any of the aspects identified herein, the additive material is embedded in the carrier.

In another aspect of the disclosure, which may be combined with any of the aspects identified herein, a source reel and a take-up reel are operatively coupled to the controller and configured to progressively feed the film to the workpiece in response to instructions from the controller.

In another aspect of the disclosure, which may be combined with any of the aspects identified herein, a multi-axis mechanism is configured to deliver the film in one of a plurality of orientations responsive to instructions from the controller.

In another aspect of the disclosure, which may be combined with any of the aspects identified herein, the controller is configured to utilize information about previous use of the film and to reposition the film to an unused portion for a subsequent melting operation.

In another aspect of the disclosure, which may be combined with any of the aspects identified herein, the film comprises providing the film as one or more semi-rigid sheets having a carrier with the additive material adhered to the carrier.

In another aspect of the disclosure, which may be combined with any of the aspects identified herein, the first portion and the second portion of the film are separate sheets of film that each are planar in shape, and wherein aligning the second portion comprises placing the second portion in parallel with the first portion.

In another aspect of the disclosure, which may be combined with any of the aspects identified herein, aligning the second portion of the film comprises aligning an unused area of film containing the predetermined area of the first portion.

In another aspect of the disclosure, which may be combined with any of the aspects identified herein, a tool is provided for selectively removing material from the workpiece.

BRIEF DESCRIPTION OF THE DRAWINGS

For a more complete understanding of the disclosed methods and apparatus, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Any suitable apparatus may be employed in conjunction with the methods disclosed herein. In some embodiments, the methods are performed using a computer numerically controlled machine, illustrated generally in FIGS. 1-10. A computer numerically controlled machine is itself provided in other embodiments. The machine 100 illustrated in FIGS. 1-10 may be an NT-series machine, versions of which are available from DMG/Mori Seiki USA, the assignee of the present application. Other machines, however, may be used to perform the methods disclosed herein.

Figure 1:
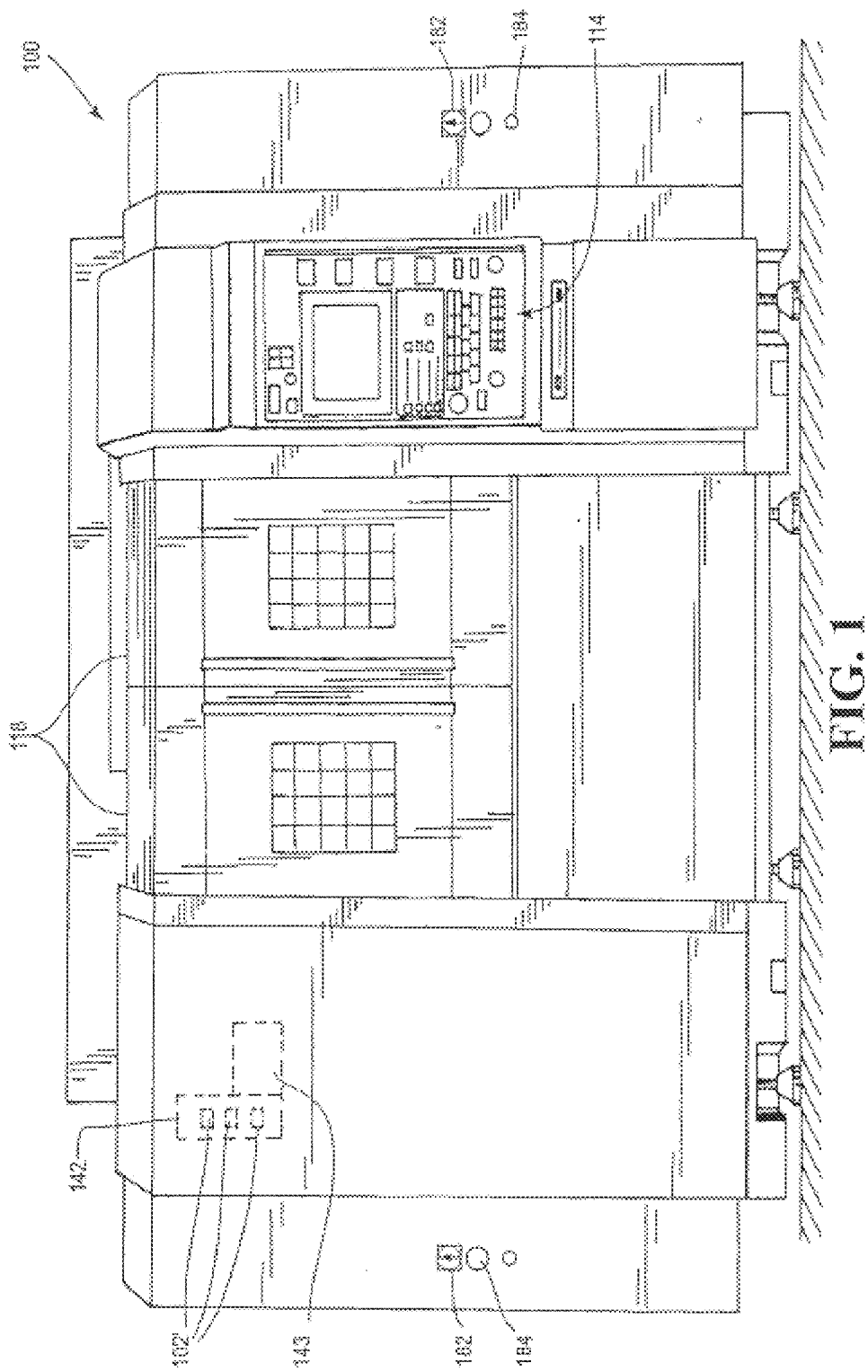
FIG. 1 is a front elevation of a computer numerically controlled machine in accordance with one embodiment of the present disclosure, shown with safety doors closed.
Figure 2:
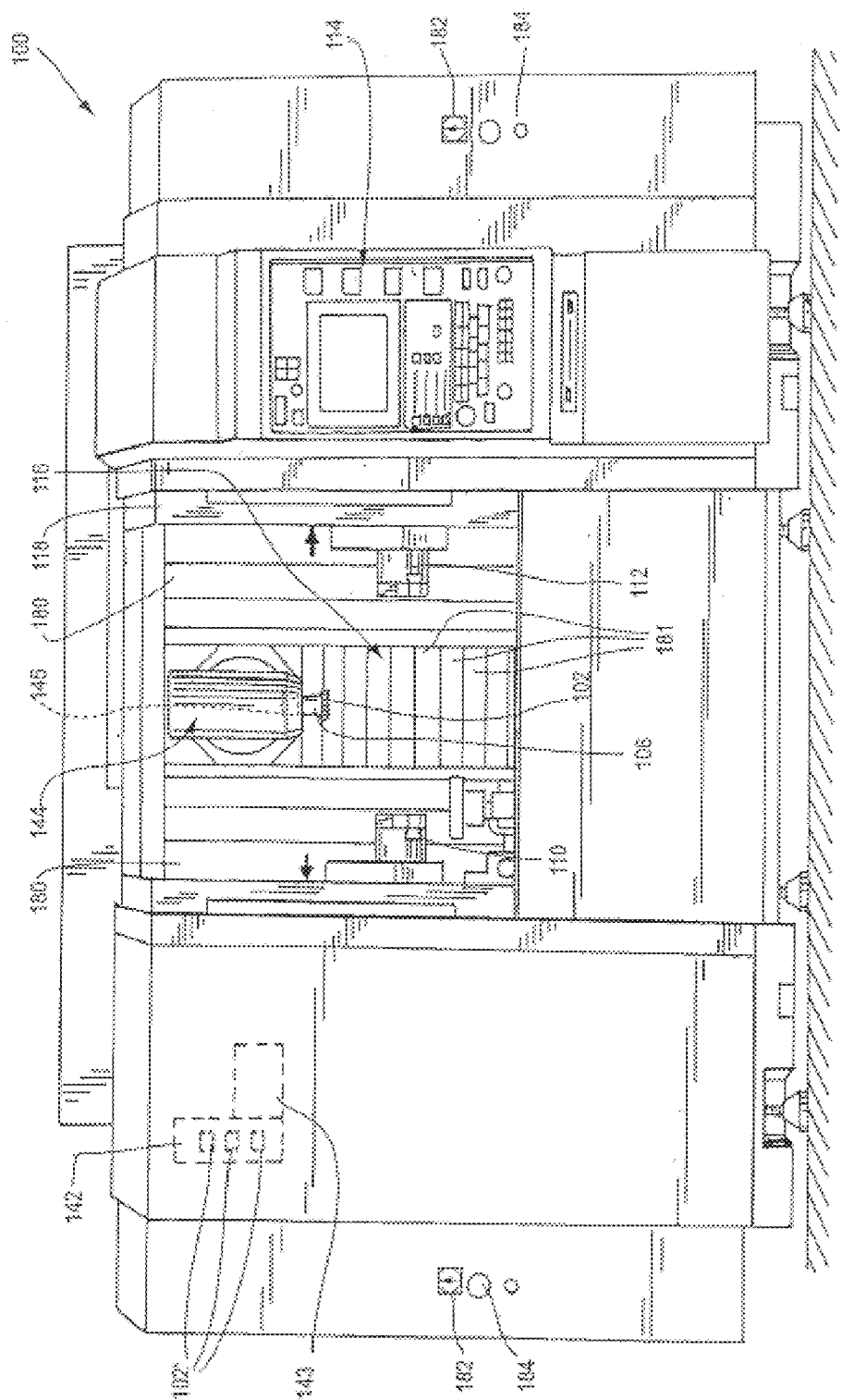
FIG. 2 is a front elevation of a computer numerically controlled machine illustrated in FIG. 1, shown with the safety doors open.
Figure 3:
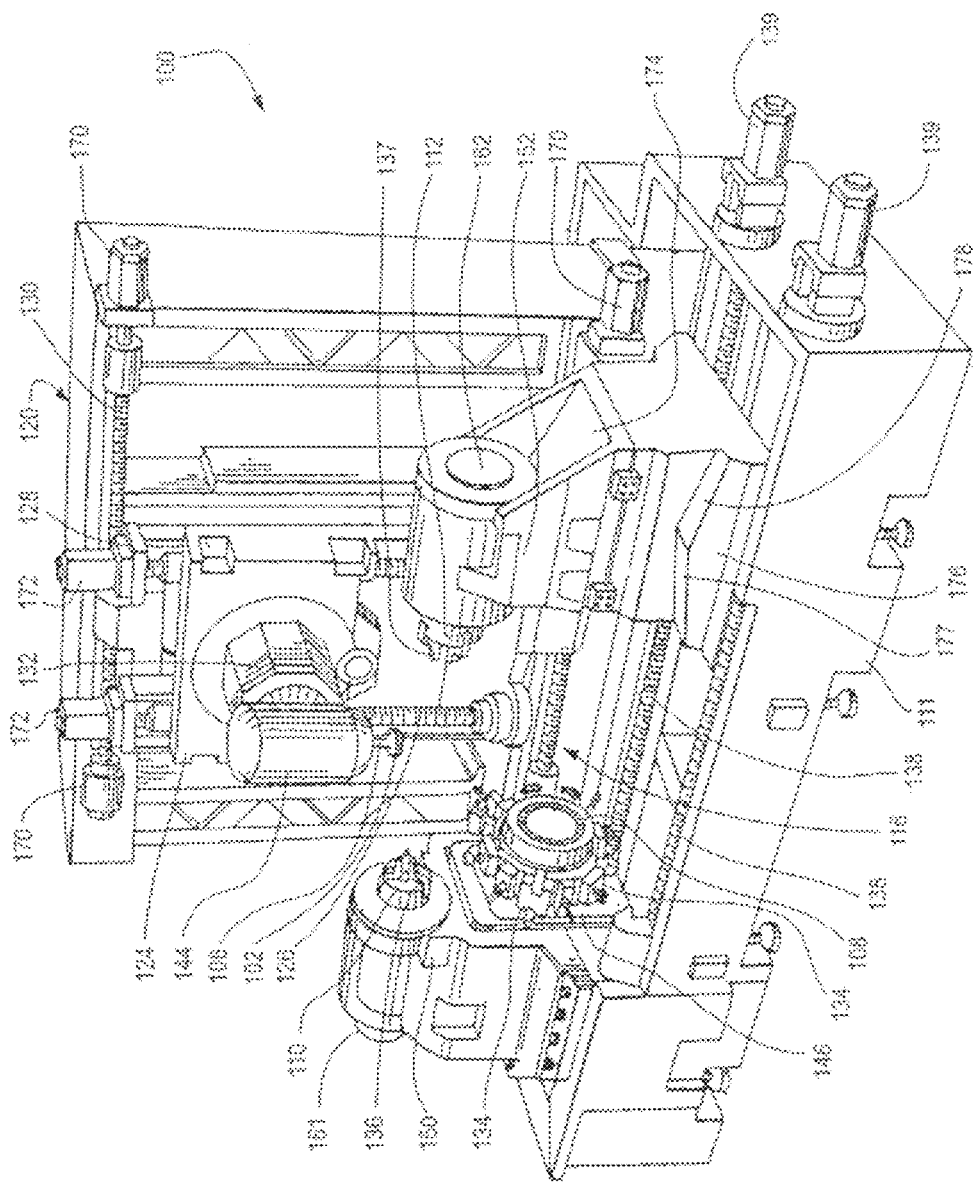
FIG. 3 is a perspective view of certain interior components of the computer numerically controlled machine illustrated in FIGS. 1 and 2, depicting a machining spindle, a first chuck, a second chuck, and a turret.

In general, with reference to the NT-series machine illustrated in FIGS. 1-3, one suitable computer numerically controlled machine 100 has at least a first retainer and a second retainer, each of which may be a tool retainer (such as a spindle retainer associated with spindle 144 or a turret retainer associated with a turret 108) or a workpiece retainer (such as chucks 110, 112). In the embodiment illustrated in the Figures, the computer numerically controlled machine 100 is provided with a spindle 144, a turret 108, a first chuck 110, and a second chuck 112. The computer numerically controlled machine 100 also has a computer control system operatively coupled to the first retainer and to the second retainer for controlling the retainers, as described in more detail below. It is understood that in some embodiments, the computer numerically controlled machine 100 may not contain all of the above components, and in other embodiments, the computer numerically controlled machine 100 may contain additional components beyond those designated herein.

As shown in FIGS. 1 and 2, the computer numerically controlled machine 100 has a machine chamber 116 in which various operations generally take place upon a workpiece (not shown). Each of the spindle 144, the turret 108, the first chuck 110, and the second chuck 112 may be completely or partially located within the machine chamber 116. In the embodiment shown, two moveable safety doors 118 separate the user from the chamber 116 to prevent injury to the user or interference in the operation of the computer numerically controlled machine 100. The safety doors 118 can be opened to permit access to the chamber 116 as illustrated in FIG. 2. The computer numerically controlled machine 100 is described herein with respect to three orthogonally oriented linear axes (X, Y, and Z), depicted in FIG. 4 and described in greater detail below. Rotational axes about the X, Y and Z axes are connoted "A," "B," and "C" rotational axes respectively.

The computer numerically controlled machine 100 is provided with a computer control system for controlling the various instrumentalities within the computer numerically controlled machine. In the illustrated embodiment, the machine is provided with two interlinked computer systems, a first computer system comprising a user interface system (shown generally at 114 in FIG. 1) and a second computer system (not illustrated) operatively connected to the first computer system. The second computer system directly controls the operations of the spindle, the turret, and the other instrumentalities of the machine, while the user interface system 114 allows an operator to control the second computer system. Collectively, the machine control system and the user interface system, together with the various mechanisms for control of operations in the machine, may be considered a single computer control system.

The computer control system may include machine control circuitry having a central processing unit (CPU) connected to a main memory. The CPU may include any suitable processor(s), such as those made by Intel and AMD. By way of example, the CPU may include a plurality of microprocessors including a master processor, a slave processor, and a secondary or parallel processor. Machine control circuitry, as used herein, comprises any combination of hardware, software, or firmware disposed in or outside of the machine 100 that is configured to communicate with or control the transfer of data between the machine 100 and a bus, another computer, processor, device, service, or network. The machine control circuitry, and more specifically the CPU, comprises one or more controllers or processors and such one or more controllers or processors need not be disposed proximal to one another and may be located in different devices or in different locations. The machine control circuitry, and more specifically the main memory, comprises one or more memory devices which need not be disposed proximal to one another and may be located in different devices or in different locations. The machine control circuitry is operable to execute all of the various machine tool methods and other processes disclosed herein.

In some embodiments, the user operates the user interface system to impart programming to the machine; in other embodiments, programs can be loaded or transferred into the machine via external sources. It is contemplated, for instance, that programs may be loaded via a PCMCIA interface, an RS-232 interface, a universal serial bus interface (USB), or a network interface, in particular a TCP/IP network interface. In other embodiments, a machine may be controlled via conventional PLC (programmable logic controller) mechanisms (not illustrated).

As further illustrated in FIGS. 1 and 2, the computer numerically controlled machine 100 may have a tool magazine 142 and a tool changing device 143. These cooperate with the spindle 144 to permit the spindle to operate with any one of multiple tools. Generally, a variety of tools may be provided; in some embodiments, multiple tools of the same type may be provided.

The spindle 144 is mounted on a carriage assembly 120 that allows for translational movement along the X- and Z-axis, and on a ram 132 that allows the spindle 144 to be moved in the Y-axis. The ram 132 is equipped with a motor to allow rotation of the spindle in the B-axis, as set forth in more detail below. As illustrated, the carriage assembly has a first carriage 124 that rides along two threaded vertical rails (one rail shown at 126) to cause the first carriage 124 and spindle 144 to translate in the X-axis. The carriage assembly also includes a second carriage 128 that rides along two horizontally disposed threaded rails (one shown in FIG. 3 at 130) to allow movement of the second carriage 128 and spindle 144 in the Z-axis. Each carriage 124, 128 engages the rails via plural ball screw devices whereby rotation of the rails 126, 130 causes translation of the carriage in the X- or Z-direction respectively. The rails are equipped with motors 170 and 172 for the horizontally disposed and vertically disposed rails respectively.

The spindle 144 holds the tool 102 by way of a spindle connection and a tool retainer 106. The spindle connection 145 (shown in FIG. 2) is connected to the spindle 144 and is contained within the spindle 144. The tool retainer 106 is connected to the spindle connection and holds the tool 102. Various types of spindle connections are known in the art and can be used with the computer numerically controlled machine 100. Typically, the spindle connection is contained within the spindle 144 for the life of the spindle. An access plate 122 for the spindle 144 is shown in FIGS. 5 and 6.

The first chuck 110 is provided with jaws 136 and is disposed in a stock 150 that is stationary with respect to the base 111 of the computer numerically controlled machine 100. The second chuck 112 is also provided with jaws 137, but the second chuck 112 is movable with respect to the base 111 of the computer numerically controlled machine 100. More specifically, the machine 100 is provided with threaded rails 138 and motors 139 for causing translation in the Z-direction of the second stock 152 via a ball screw mechanism as heretofore described. To assist in swarf removal, the stock 152 is provided with a sloped distal surface 174 and a side frame 176 with Z-sloped surfaces 177, 178. Hydraulic controls and associated indicators for the chucks 110, 112 may be provided, such as the pressure gauges 182 and control knobs 184 shown in FIGS. 1 and 2. Each stock is provided with a motor (161, 162 respectively) for causing rotation of the chuck.

Figure 5:
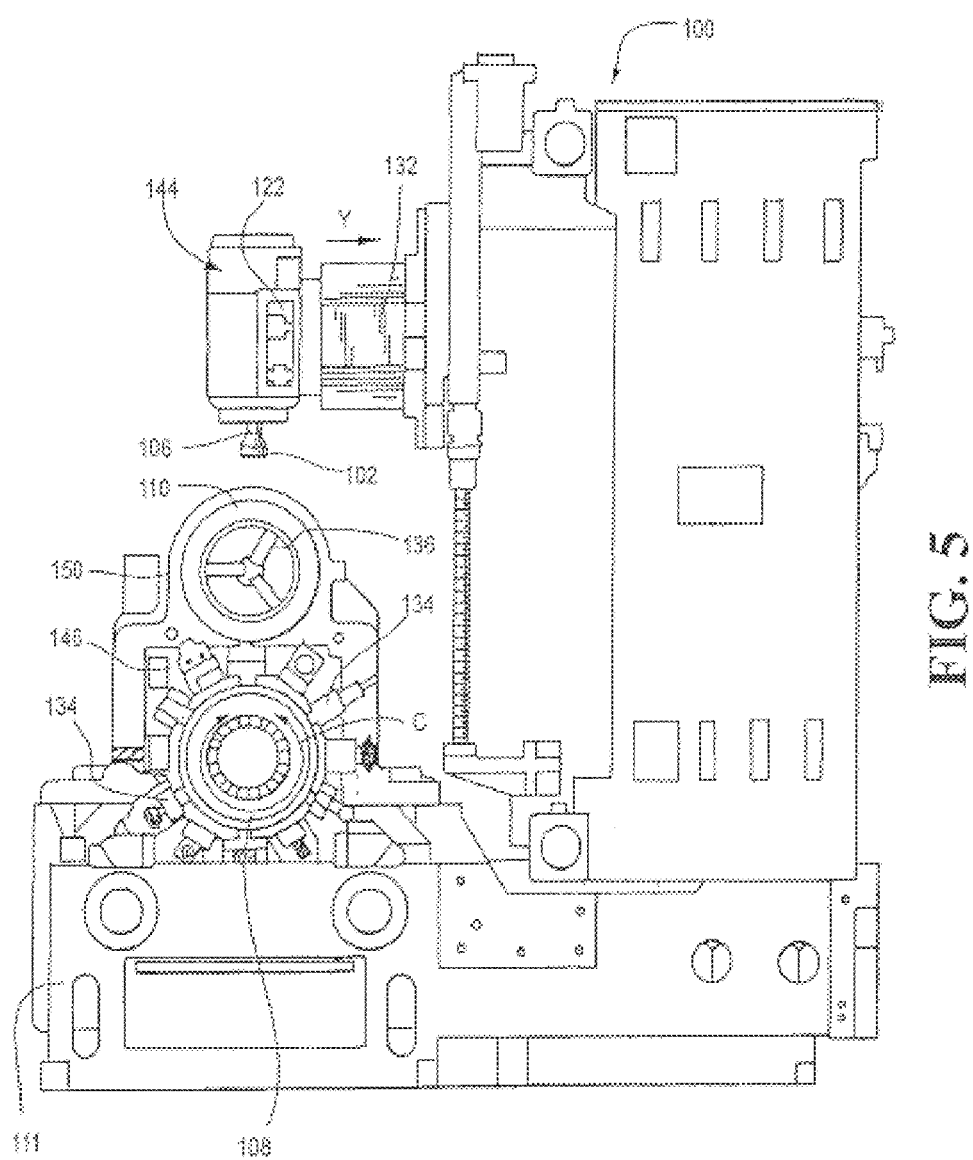
FIG. 5 is a side view of the first chuck, machining spindle, and turret of the machining center illustrated in FIG. 1.
Figure 6:
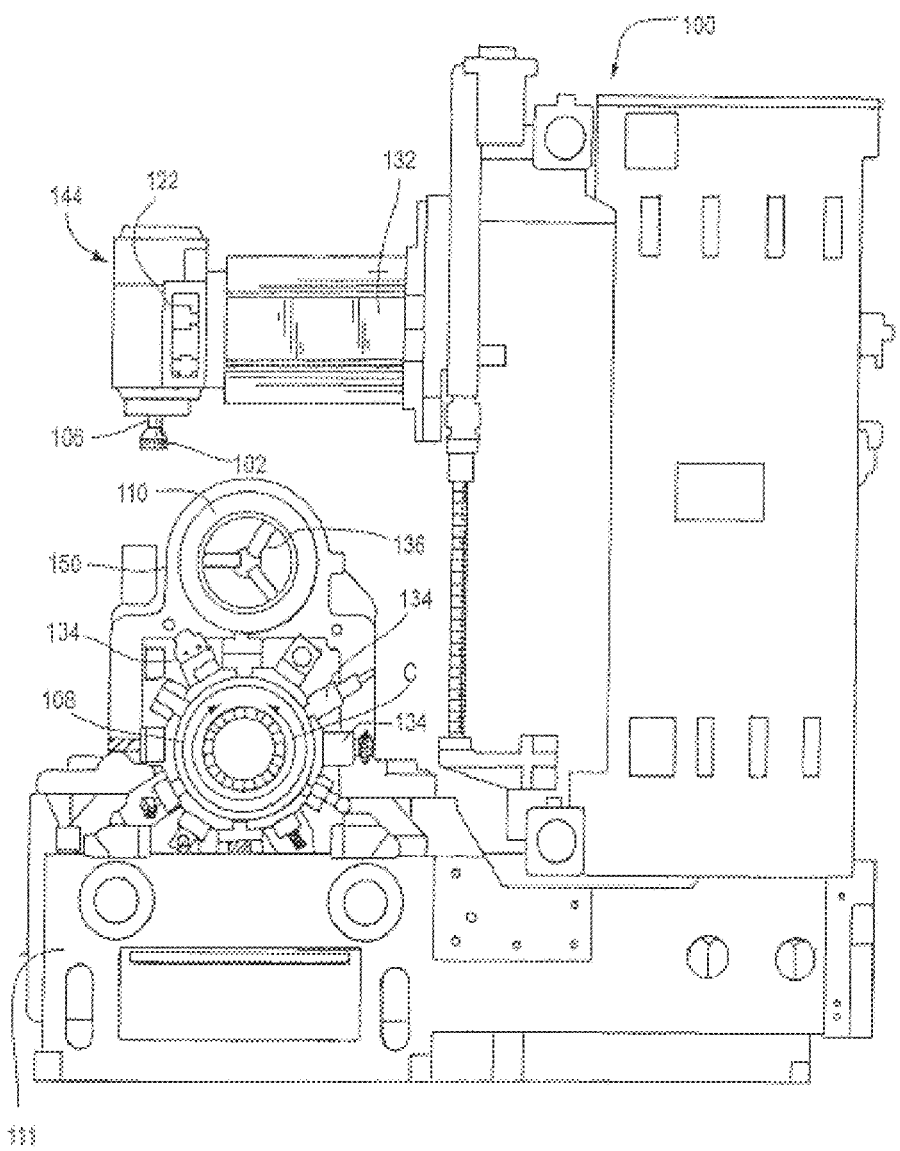
FIG. 6 is a view similar to FIG. 5 but in which a machining spindle has been translated in the Y-axis.
Figure 9:
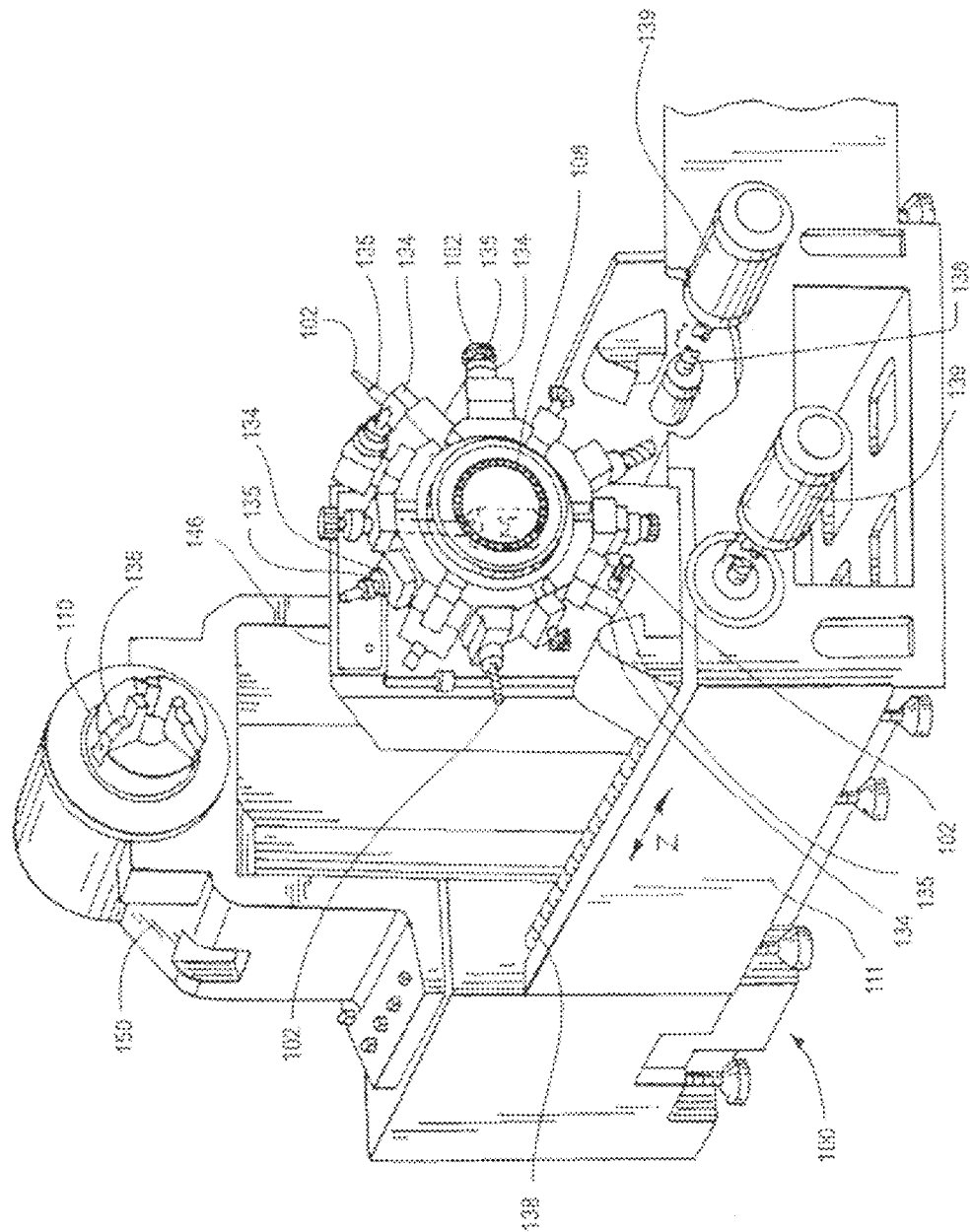
FIG. 9 is a perspective view of the first chuck and turret illustrated in FIG. 2, depicting movement of the turret and turret stock in the Z-axis relative to the position of the turret in FIG. 2.

The turret 108, which is best depicted in FIGS. 5, 6 and 9, is mounted in a turret stock 146 (FIG. 5) that also engages rails 138 and that may be translated in a Z-direction, again via ball-screw devices. The turret 108 is provided with various turret connectors 134, as illustrated in FIG. 9. Each turret connector 134 can be connected to a tool retainer 135 or other connection for connecting to a tool. Since the turret 108 can have a variety of turret connectors 134 and tool retainers 135, a variety of different tools can be held and operated by the turret 108. The turret 108 may be rotated in a C' axis to present different ones of the tool retainers (and hence, in many embodiments, different tools) to a workpiece.

Figure 4:
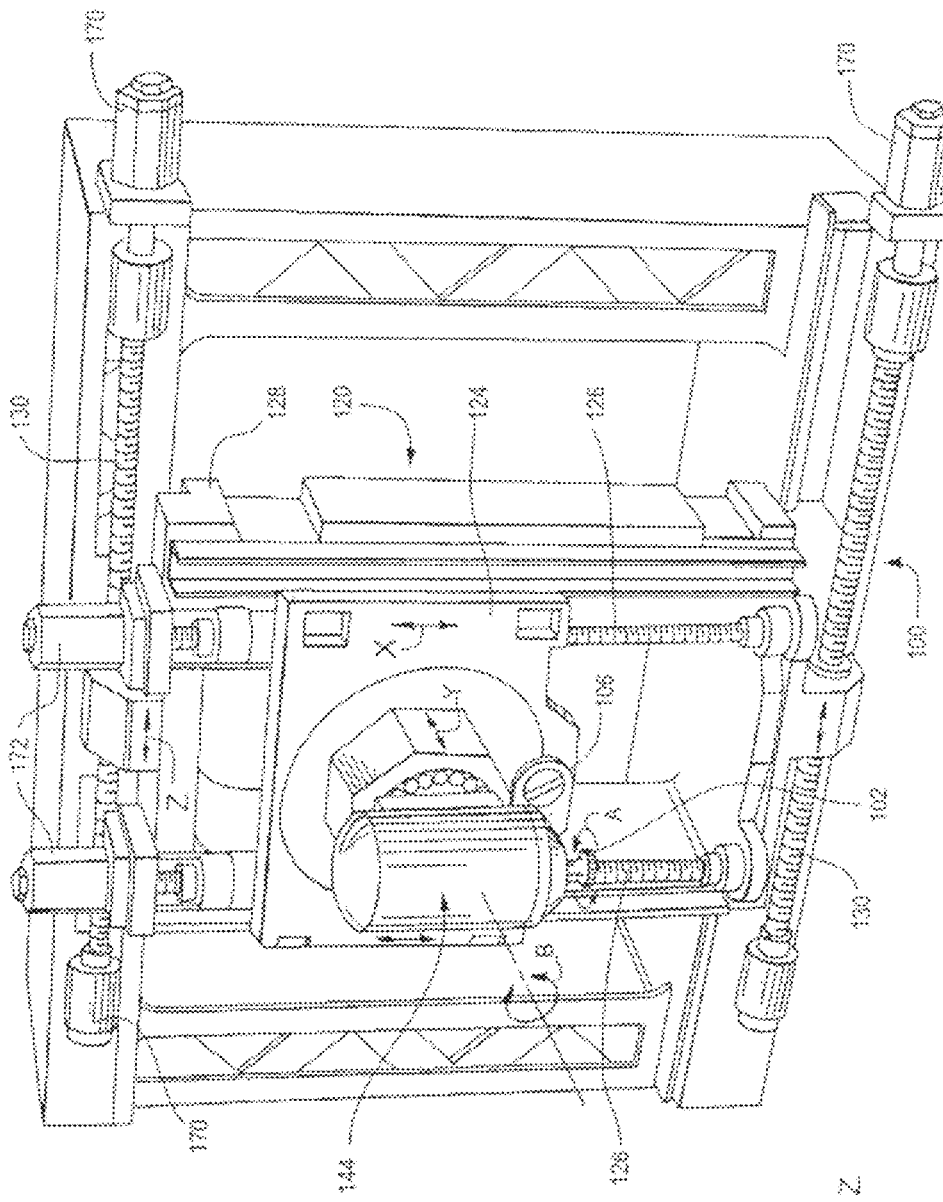
FIG. 4 a perspective view, enlarged with respect to FIG. 3 illustrating the machining spindle and the horizontally and vertically disposed rails via which the spindle may be translated.
Figure 4:
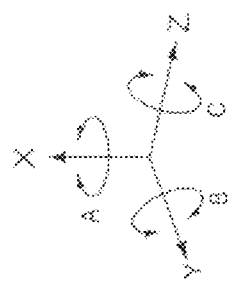
Figure 7:
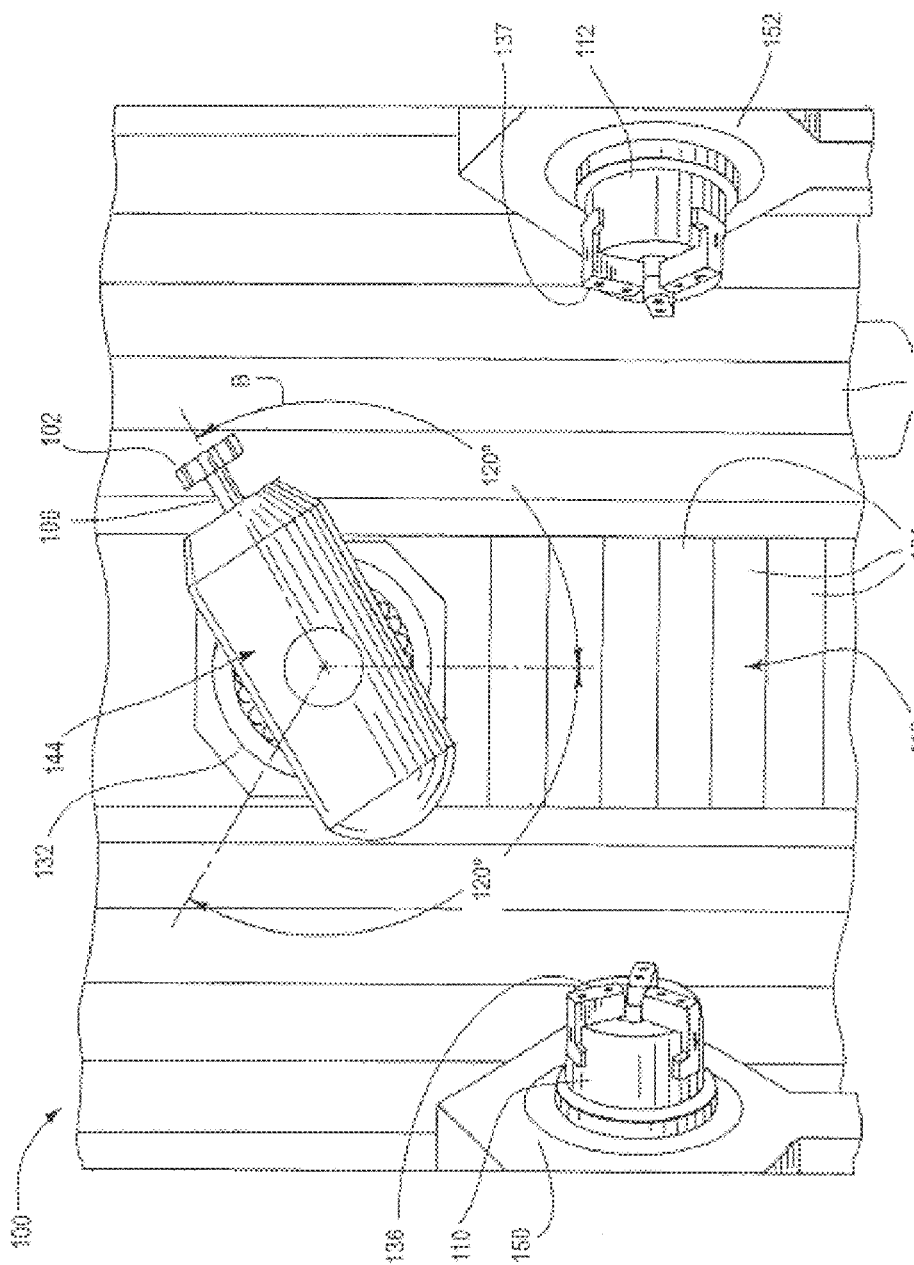
FIG. 7 is a front view of the spindle, first chuck, and second chuck of the computer numerically controlled machine illustrated in FIG. 1, including a line depicting the permitted path of rotational movement of this spindle.
Figure 8:
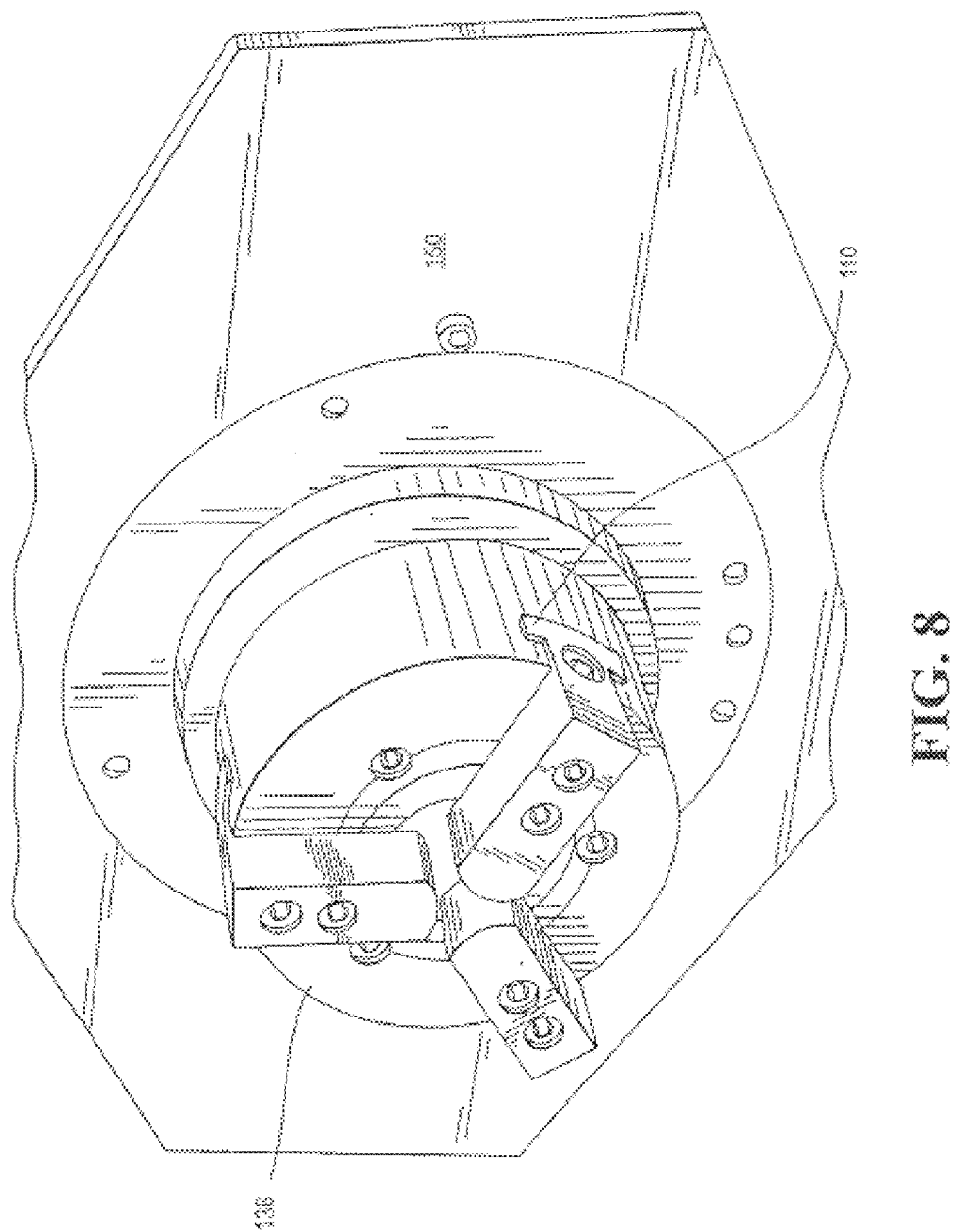
FIG. 8 is a perspective view of the second chuck illustrated in FIG. 3, enlarged with respect to FIG. 3.

It is thus seen that a wide range of versatile operations may be performed. With reference to tool 102 held in tool retainer 106, such tool 102 may be brought to bear against a workpiece (not shown) held by one or both of chucks 110, 112. When it is necessary or desirable to change the tool 102, a replacement tool 102 may be retrieved from the tool magazine 142 by means of the tool changing device 143. With reference to FIGS. 4 and 5, the spindle 144 may be translated in the X and Z directions (shown in FIG. 4) and Y direction (shown in FIGS. 5 and 6). Rotation in the B axis is depicted in FIG. 7, the illustrated embodiment permitting rotation within a range of 120 degrees to either side of the vertical. Movement in the Y direction and rotation in the B axis are powered by motors (not shown) that are located behind the carriage 124.

Generally, as seen in FIGS. 2 and 7, the machine is provided with a plurality of vertically disposed leaves 180 and horizontal disposed leaves 181 to define a wall of the chamber 116 and to prevent swarf from exiting this chamber.

The components of the machine 100 are not limited to the heretofore described components. For instance, in some instances an additional turret may be provided. In other instances, additional chucks and/or spindles may be provided. Generally, the machine is provided with one or more mechanisms for introducing a cooling liquid into the chamber 116.

In the illustrated embodiment, the computer numerically controlled machine 100 is provided with numerous retainers. Chuck 110 in combination with jaws 136 forms a retainer, as does chuck 112 in combination with jaws 137. In many instances these retainers will also be used to hold a workpiece. For instance, the chucks and associated stocks will function in a lathe-like manner as the headstock and optional tailstock for a rotating workpiece. Spindle 144 and spindle connection 145 form another retainer. Similarly, the turret 108, when equipped with plural turret connectors 134, provides a plurality of retainers (shown in FIG. 9).

The computer numerically controlled machine 100 may use any of a number of different types of tools known in the art or otherwise found to be suitable. For instance, the tool 102 may be a cutting tool such as a milling tool, a drilling tool, a grinding tool, a blade tool, a broaching tool, a turning tool, or any other type of cutting tool deemed appropriate in connection with a computer numerically controlled machine 100. Additionally or alternatively, the tool may be configured for an additive manufacturing technique, as discussed in greater detail below. In either case, the computer numerically controlled machine 100 may be provided with more than one type of tool, and via the mechanisms of the tool changing device 143 and magazine 142, the spindle 144 may be caused to exchange one tool for another. Similarly, the turret 108 may be provided with one or more tools 102, and the operator may switch between tools 102 by causing rotation of the turret 108 to bring a new turret connector 134 into the appropriate position.

Figure 10:
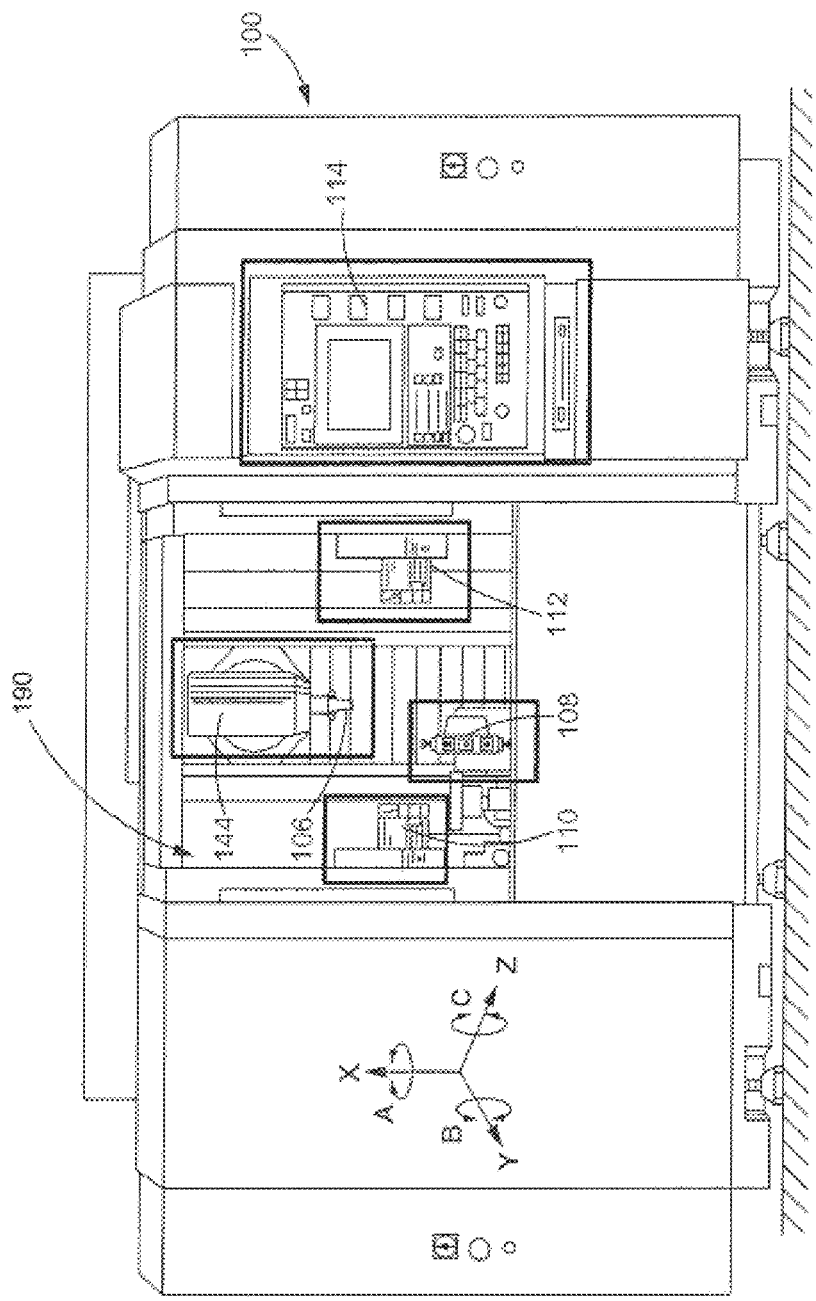
FIG. 10 is a front view of the computer numerically controlled machine of FIG. 1 with the front doors open.

The computer numerically controlled machine 100 is illustrated in FIG. 10 with the safety doors open. As shown, the computer numerically controlled machine 100 may be provided with at least a tool retainer 106 disposed on a spindle 144, a turret 108, one or more chucks or workpiece retainers 110, 112 as well as a user interface 114 configured to interface with a computer control system of the computer numerically controlled machine 100. Each of the tool retainer 106, spindle 144, turret 108 and workpiece retainers 110, 112 may be disposed within a machining area 190 and selectively rotatable and/or movable relative to one another along one or more of a variety of axes.

As indicated in FIG. 10, for example, the X, Y, and Z axes may indicate orthogonal directions of movement, while the A, B, and C axes may indicate rotational directions about the X, Y, and Z axes, respectively. These axes are provided to help describe movement in a three-dimensional space, and therefore, other coordinate schemes may be used without departing from the scope of the appended claims. Additionally, use of these axes to describe movement is intended to encompass actual, physical axes that are perpendicular to one another, as well as virtual axes that may not be physically perpendicular but in which the tool path is manipulated by a controller to behave as if they were physically perpendicular.

With reference to the axes shown in FIG. 10, the tool retainer 106 may be rotated about a B-axis of the spindle 144 upon which it is supported, while the spindle 144 itself may be movable along an X-axis, a Y-axis and a Z-axis. The turret 108 may be movable along an XA-axis substantially parallel to the X-axis and a ZA-axis substantially parallel to the Z axis. The workpiece retainers 110, 112 may be rotatable about a C-axis, and further, independently translatable along one or more axes relative to the machining area 190. While the computer numerically controlled machine 100 is shown as a six-axis machine, it is understood that the number of axes of movement is merely exemplary, as the machine may be capable of movement in less than or greater than six axes without departing from the scope of the claims.

Figure 11:
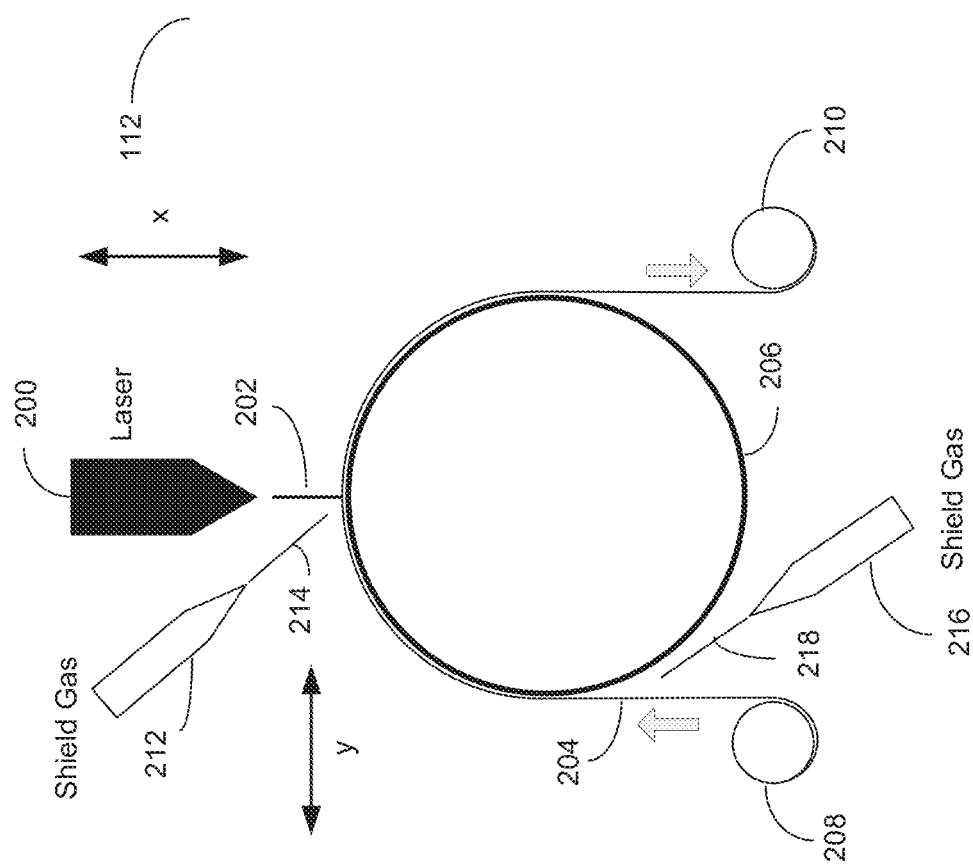
FIG. 11 is a view of an additive manufacturing arrangement for the machine of FIG. 1.

The CNC machine 100 as described above is useful for subtractive operations to remove material from a workpiece. Referring to FIG. 11, by mounting a laser 200 onto the spindle 144 or in place of the spindle 144 and an additive material delivery system, an additive operation can also be performed. In this embodiment, the laser 200 may produce a laser beam 202 that selectively heats a film 204 that is transported over a work platform 206 between a source reel 208 and a take-up reel 210.

Figure 12:
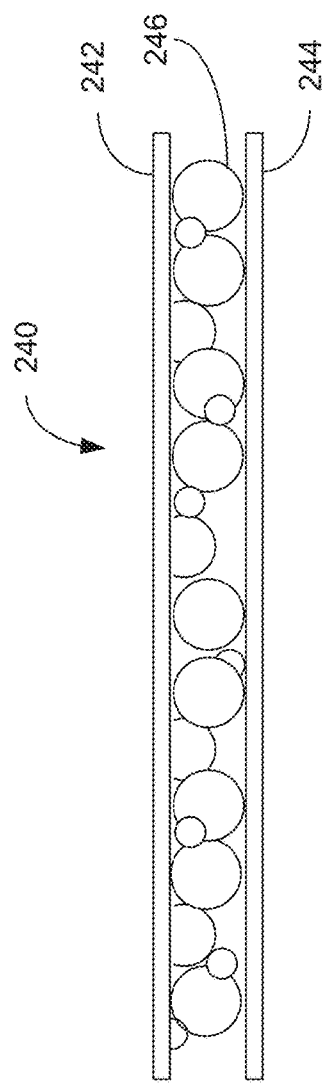
FIG. 12 is a side view of a film having two carriers and a material for additive manufacturing.
Figure 13:
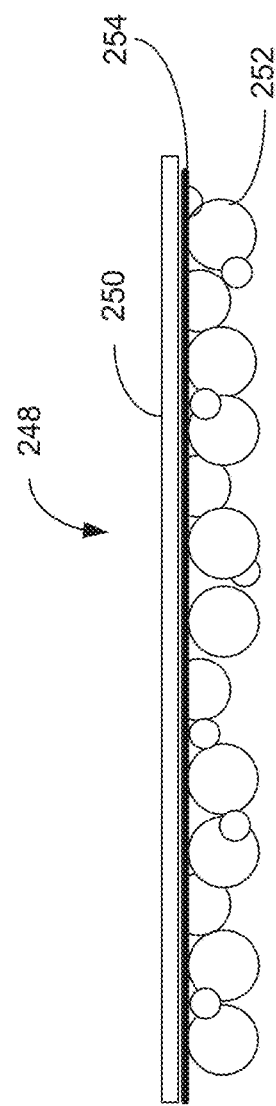
FIG. 13 is a side view of a film having a single carrier and a material for additive manufacturing.
Figure 14:
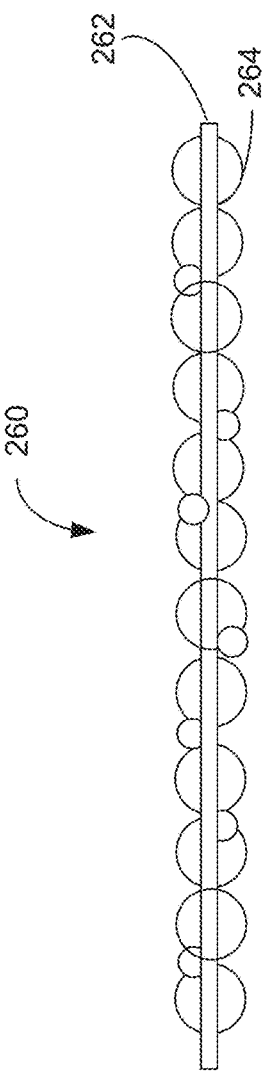
FIG. 14 is a side view of a film having a single carrier and a material for additive manufacturing.

Turning briefly to FIGS. 12-14, and FIG. 25 various embodiments of the film 204 are shown in more detail. In these embodiments, the film is in the form of a ribbon. A sheet form of the film is described separately below. FIG. 12 illustrates a film 240 having a first carrier layer 242 and a second carrier layer 244. Between the carrier layers is an additive material, such as powdered metal 246 that melts when sufficiently heated. The embodiment of FIG. 12 may simply capture loose powdered metal 246 between the layers 242 and 244. The embodiment of FIG. 13 is a film 248 that has a single carrier layer 250 with the powdered metal 252 adhered to the carrier by an adhesive 254 or a static charge. FIG. 14 shows an embodiment of a film 260 with the powdered metal 264 infused in the carrier layer 262. The carrier, e.g., carrier layers 242, 244, 246, 262 may be considered sacrificial layers in that they are destroyed or removed either during the heating process or by a post-heating operation. In various embodiments, the carrier layers 242, 244, 246, 262 may be paper or plastic-based but other carrier layer formulations may be used.

Figure 25:
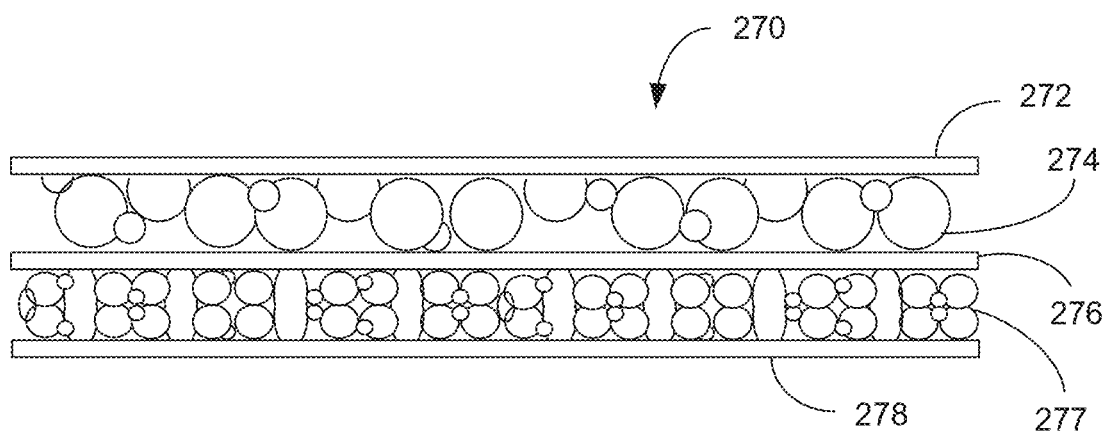
FIG. 25 is a side view of a film having three carriers and a material for additive manufacturing.

FIG. 25 illustrates another embodiment of the film 204. A film 270 includes a first carrier layer 272, a second carrier 276, and a third carrier layer 278. In between the first and second layers 272, 276 is a first additive material 274. In between the second layer 276 and third layer 278 is another additive material 277. In some embodiments, the first and second additive material 274, 276 may be the same. In other embodiments, the first additive material 274 may be one composition and the second additive material 277 may be another composition. In this way, the additive process of manufacturing a workpiece may include different formulations of powered metal, plastics, etc., to incorporate different desirable traits of each, such as durability and corrosion resistance.

Returning to FIG. 11, the film 204 may carry or include an additive material, such as a powered metal. In order to reduce oxidation of the powdered metal while being heated during the melting process, a shield gas such as argon, helium, or carbon dioxide, among others, may be dispensed on the film 204 during processing using a shield gas delivery system such as a jet or nozzle. For example, a first gas jet 212 may apply shield gas 214 at the contact point of the laser beam 202 and film 204. Another gas jet 216 may apply shield gas 218 between the film 204 and the work platform 206 to displace air that may be entrapped as the film 204 is advanced. In other embodiments, a gas jet may be disposed circumferentially around the laser beam 202 to provide a more even coverage of shielding gas. As the film 204 is advanced, a workpiece may be formed on the work platform 206. Either or both of the laser 200 and work platform 206 may be moved in multiple axes to position the workpiece for a subsequent layer. Similarly, a transport assembly including the film 204 and reels 208, 210 may be moved in multiple axes both for proper positioning of the next layer with respect to the workpiece, but also to allow the film 204 to be repositioned in order to more fully use the film 204 as discussed with respect to FIG. 15.

Figure 15:
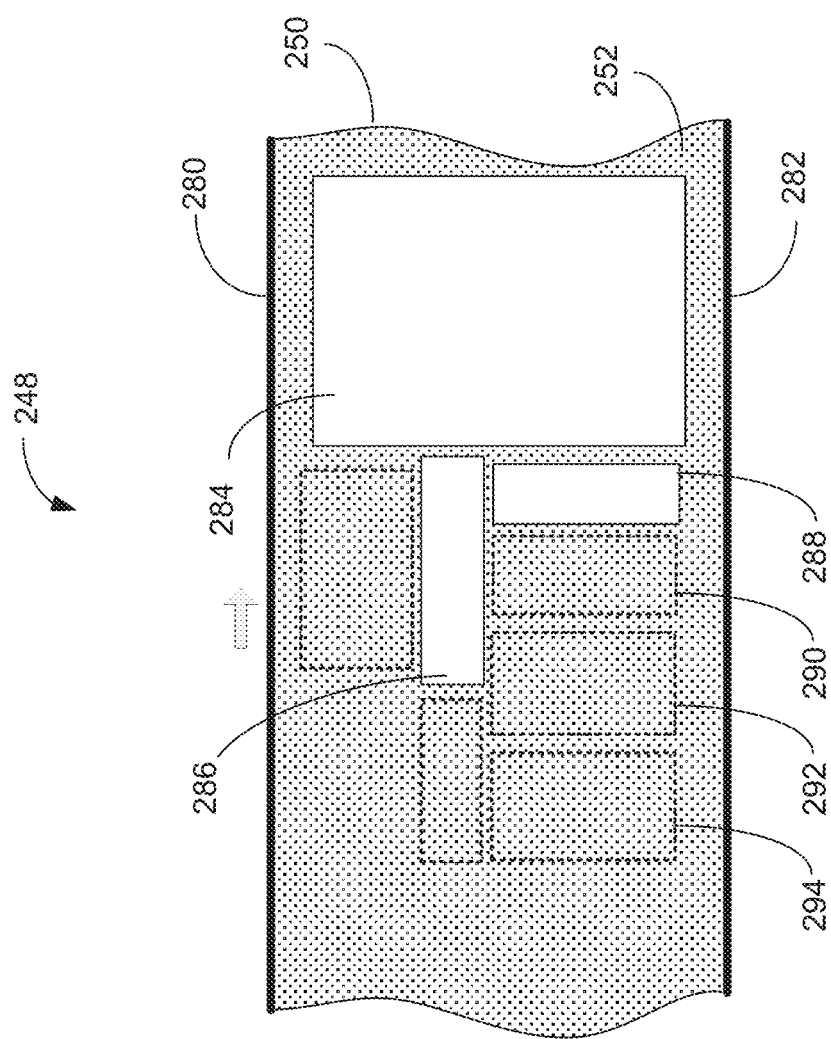
FIG. 15 is a top view of a film.

FIG. 15 illustrates a top view of the exemplary film 248 of FIG. 13 with carrier layer 250 and powdered metal 252 disposed on the carrier layer 250. In the illustration, patterned areas 284, 286, and 288 have been exposed to the laser beam 202 and the powdered metal 252 and corresponding carrier layer have been removed. However, because the film 248 can be moved back and forth between the source reel 208 and take-up reel 210 and because the film 248 itself can be positioned by, for example, using a five-axis mechanism, the film 248 can be selectively repositioned to allow more of the film 248 to be used. As illustrated, even though patterned area 286 extends farther in the direction of travel than patterned area 288, the film can be rewound to allow patterned area 288 to be used. When the shapes required to implement the full workpiece are known, a patterning program may be used to efficiently arrange the different patterns on the film 248. For example, areas 290, 292, and 294 illustrate locations that have been identified for successively larger layers that will be placed on patterned area 288. Reinforced edges 280 and 282 may be added to the carrier layer 250 for use in moving and aligning the film 248. Other embodiments of the film may be used in a similar fashion.

Figure 16:
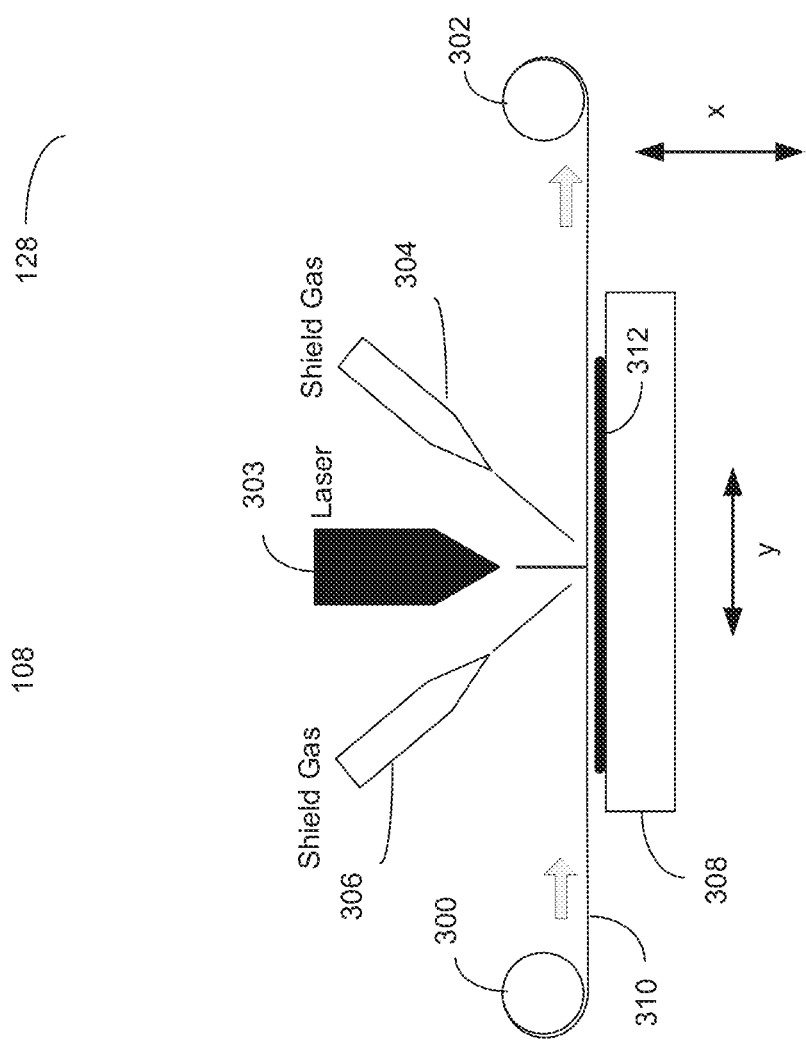
FIG. 16 is view of another embodiment of an additive manufacturing arrangement for the machine of FIG. 1.

FIG. 16 illustrates a planar implementation of a work platform 308 having a workpiece 312 formed by selectively melting metal from a film 310 using a laser 303. In this embodiment, the film 310 is provided in the form of a metal foil. Accordingly, the film may be comprised of metal material provided in sheet form, with or without a carrier layer. The film 310 may be elevated above the work platform 308 such that a gap is provided between the film 310 and the workpiece 312. As a result, melted foil metal will fall from the film 310 and onto the workpiece 312 without welding the film 310 to the workpiece 312 or work platform 308. As above, the film 310 may be transported via a source reel 300 and a take-up reel 302. Shield gasses may be dispensed via jets 304 and 306. The work platform 308 may translate in one or two axes, but as will be discussed in more detail below, translation in additional axes may increase the flexibility of the additive manufacturing operation.

Figures 17, 18:
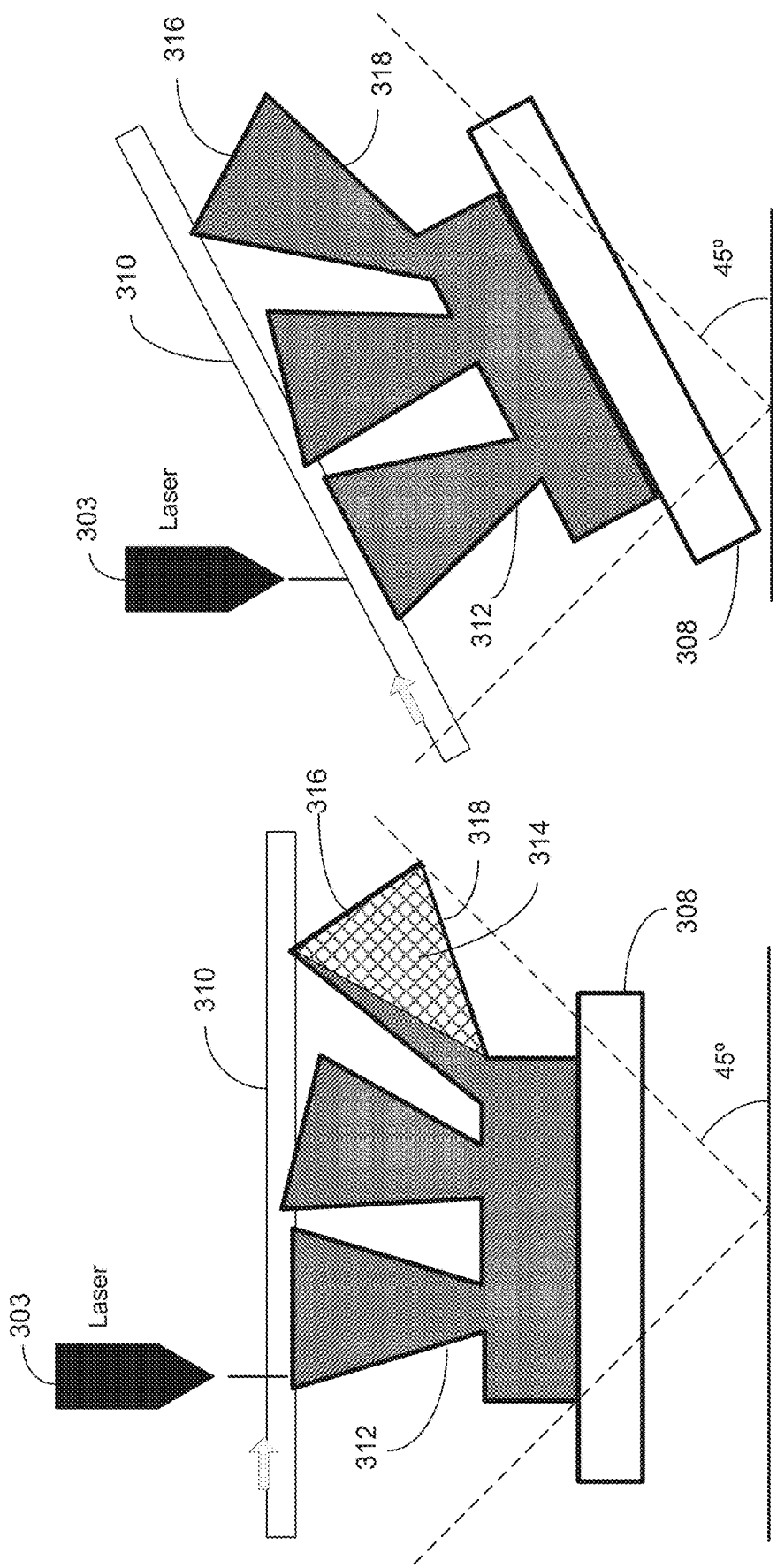
FIG. 17 is a view of a workpiece during an additive manufacturing operation.
FIG. 18 is a view of a workpiece during an additive manufacturing operation in a different configuration.

FIG. 17 illustrates the work platform 308 holding a workpiece 312 formed by successively depositing powdered metal from a film 310 using a laser 200. For clarity, the shield gas jets are not depicted. However, even when using a film 310 to transport the powdered metal special considerations may be required when forming some shapes. Because the laser 200 causes a liquid pool of metal, there may be an angle beyond which a self-supporting structure cannot be formed. That is, the liquid pool may not solidify before sliding off the previous layer of the workpiece 312. The angle shown in the exemplary embodiment of FIG. 17 is 45 degrees. This angle may vary based on the type of alloy used, the power of the laser, the size of the laser spot and corresponding pool, etc. In the illustration of FIG. 17, the area 314 bounded by the surfaces 316 and 318 may not be able to be manufactured using a layered approach for these reasons.

However, because the film 310 is not limited to application in a single horizontal plane, as with loose powdered metal, an alternate configuration may be used. FIG. 18 illustrates a configuration where the work platform 308 and film 310 have been reset to an angle that allows all the external surface angles to be within the exemplary 45 degree limit. This allows the structural element associated with surfaces 316 and 318 to be formed without any additional support structures that may have been required in a loose powder additive manufacturing device.

Figure 19:
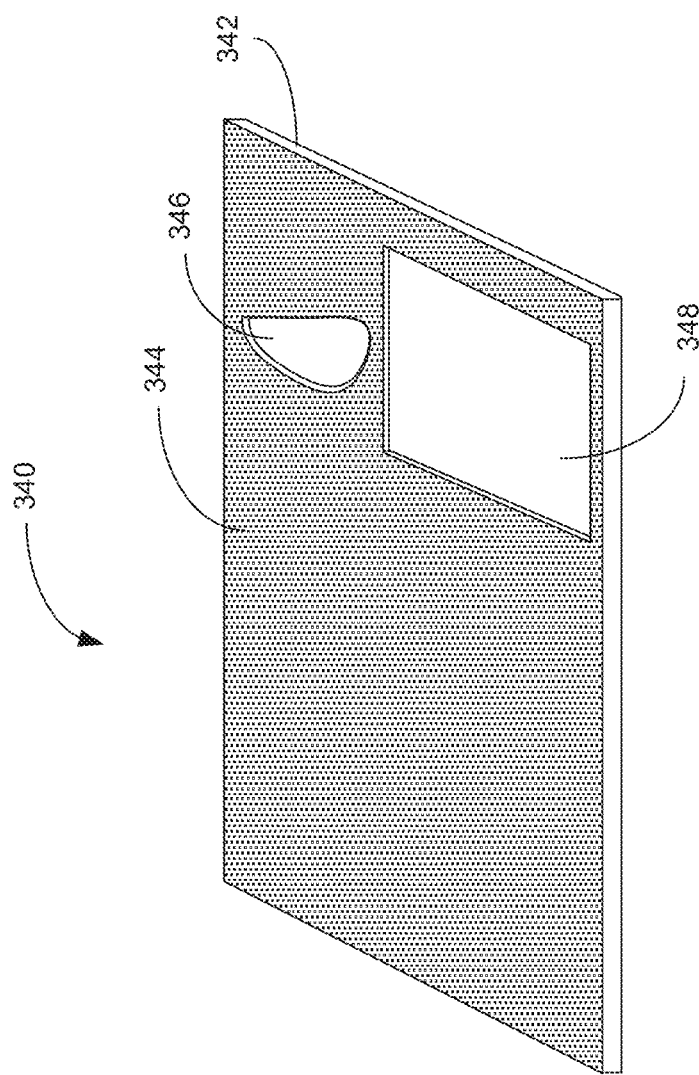
FIG. 19 is a perspective view of a sheet of film having a carrier and a material for additive manufacturing.

FIG. 19 illustrates an alternate embodiment of the ribbon form of the film used in the additive technique described above. In the embodiment of FIG. 19, the film 340 may be in the form of a rigid or semi-rigid sheet. The carrier 342 may be sacrificial and made of a thick paper or varying weights of plastic sheet or other formulations. The additive material, such as powdered metal 344 may be adhered to or impregnated in the carrier 342. As above, shapes 346, 348 may be removed from the film 340 and melted onto the workpiece 386 by heating via a laser.

Figure 20:
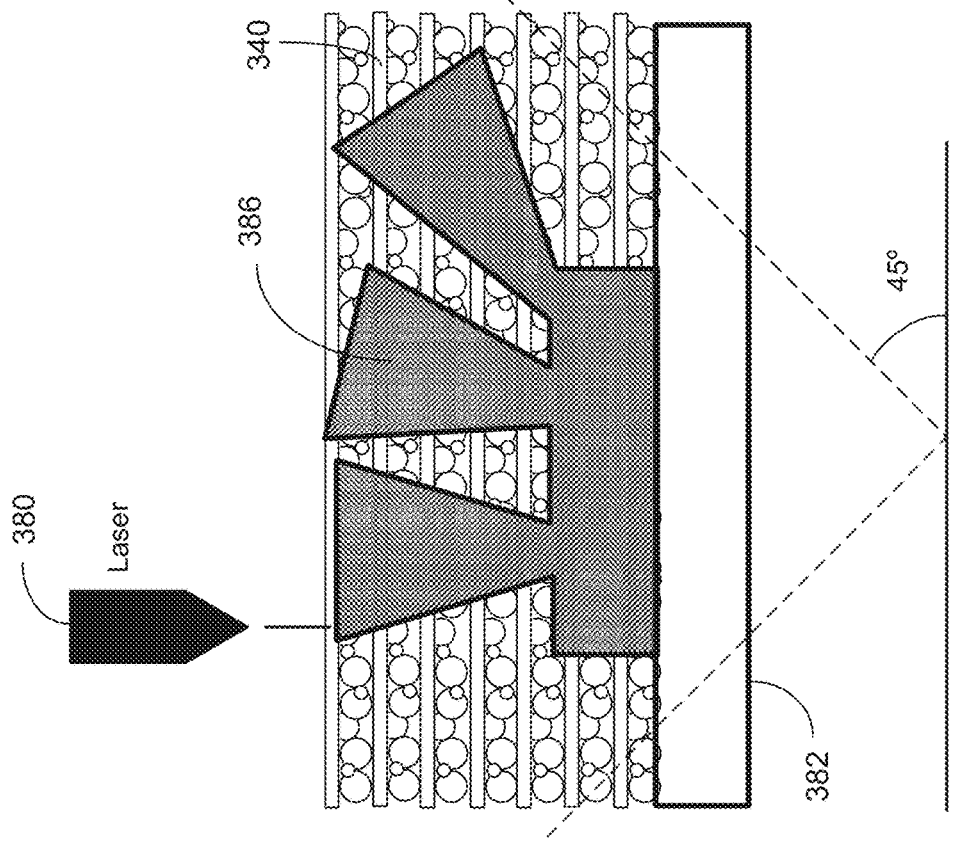
FIG. 20 is a view of a workpiece during an additive manufacturing operation using the sheet of film of FIG. 19.

Use of the film 340 is further illustrated in FIGS. 20-23. The thickness of the film 340 and size of the powdered metal are exaggerated for the sake of illustration. FIG. 20 illustrates a horizontal implementation where successive sheets of film 340 are placed on top of each other using a sheet feeder, robotic arm, etc., and selectively heated by the laser to create the workpiece 386 in layers. In this embodiment, the individual sheets of film 340 remain on the work platform 382 during successive operations and are removed by washing or etching after the workpiece 386 is complete. In this way, the unused (unheated) portions of the lower layers of film 340 act as a support for any structure above it and therefore the maximum angle of surfaces discussed above does not apply. That is, irregular shapes in virtually any configuration may be formed as long as the shape doesn't extend beyond the layers of film 340 below it. The power of the laser 380 must be controlled to not penetrate beyond the top-most layer of film 340 in order to both create the desired shape of the workpiece 386 and maintain the integrity of film 340 underneath to act as a support. Support structures used in loose powdered metal applications are formed using the same heating/melting process as the workpiece and are physically as rigid at the workpiece 386. Unlike these previous applications, the unused areas of film 340 is not a rigid structure that must be removed by machining, grinding, etc., but rather it can be removed using solvents or gentle heat. For example, the workpiece 386 may be removed from the machine 100 and placed in a bath of solvents to remove the unused film 340. This isolates the unused material, e.g., the powdered metal at the solvent bath unlike loose powdered applications where the unused loose powder is necessarily located at the machine 100. The removed material is more easily recovered than excess loose powdered metal and simplifies recycling of unused powdered metal and machine change-over to different configurations and alloys.

Figure 21:
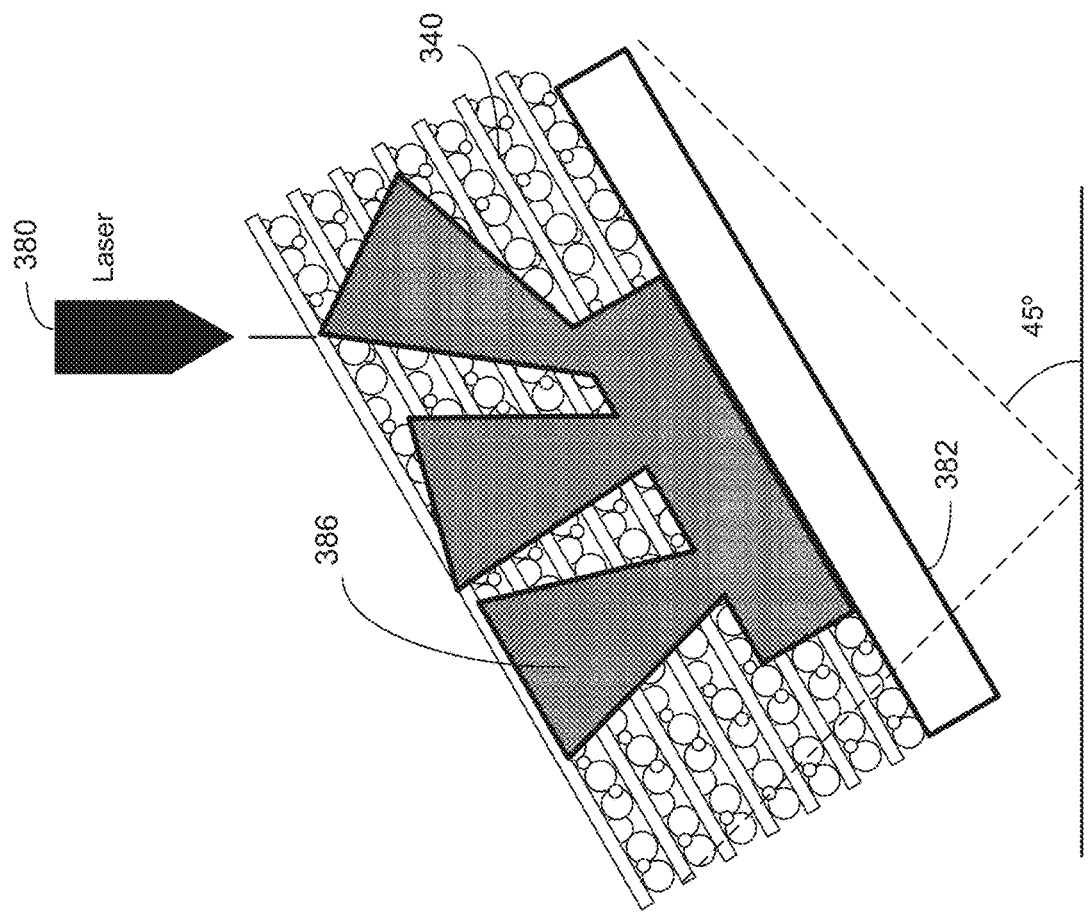
FIG. 21 is a view of a workpiece during an additive manufacturing operation using the sheet of film of FIG. 19 in a different configuration.
Figure 22:
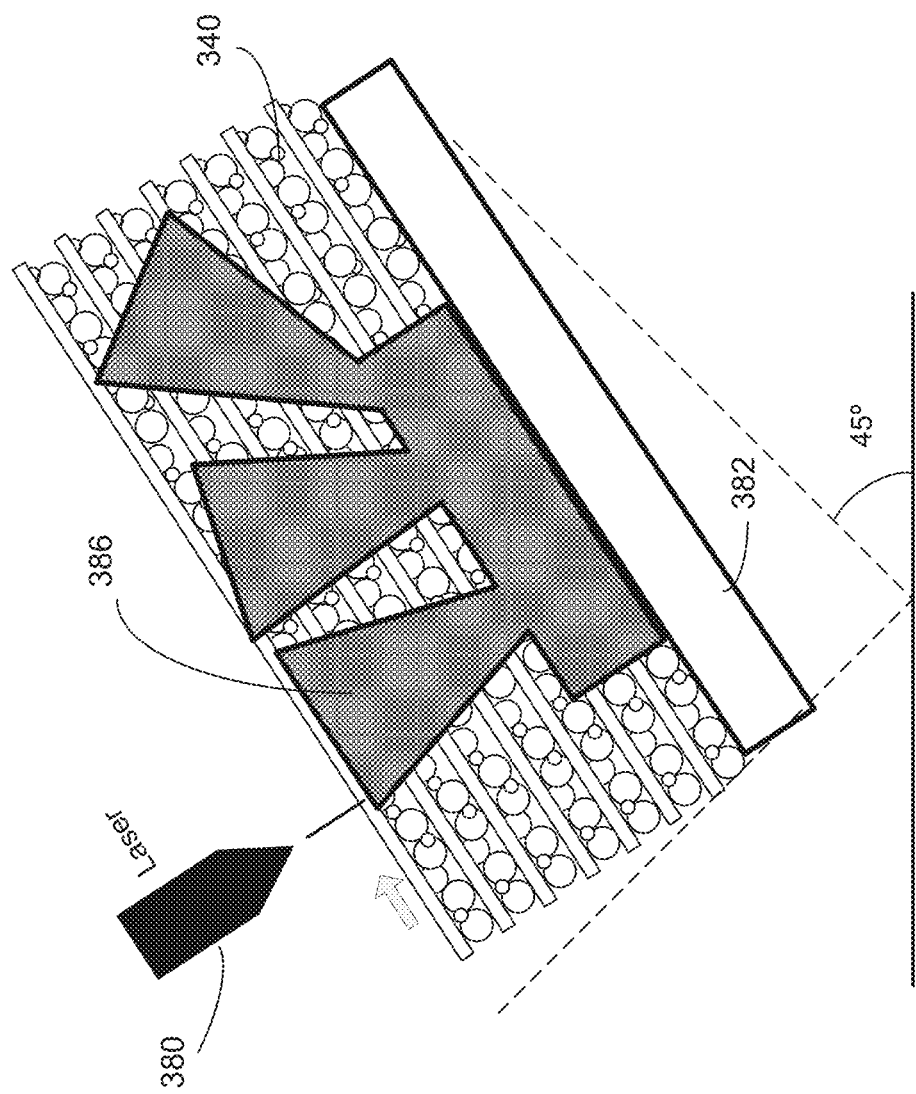
FIG. 22 is a view of a workpiece during an additive manufacturing operation using the sheet of film of FIG. 19 in another different configuration.

FIGS. 21 and 22 illustrate different embodiments of the configuration of FIG. 20. For example, FIG. 21 shows the work platform 382 positioned at an angle relative to horizontal. FIG. 22 shows the work platform 382 positioned at an angle and the laser 380 re-aligned to be normal to the work platform 382 and/or the workpiece 386. This alignment may help control laser spot size or shape and so provide better uniformity of deposited material.

Figure 23:
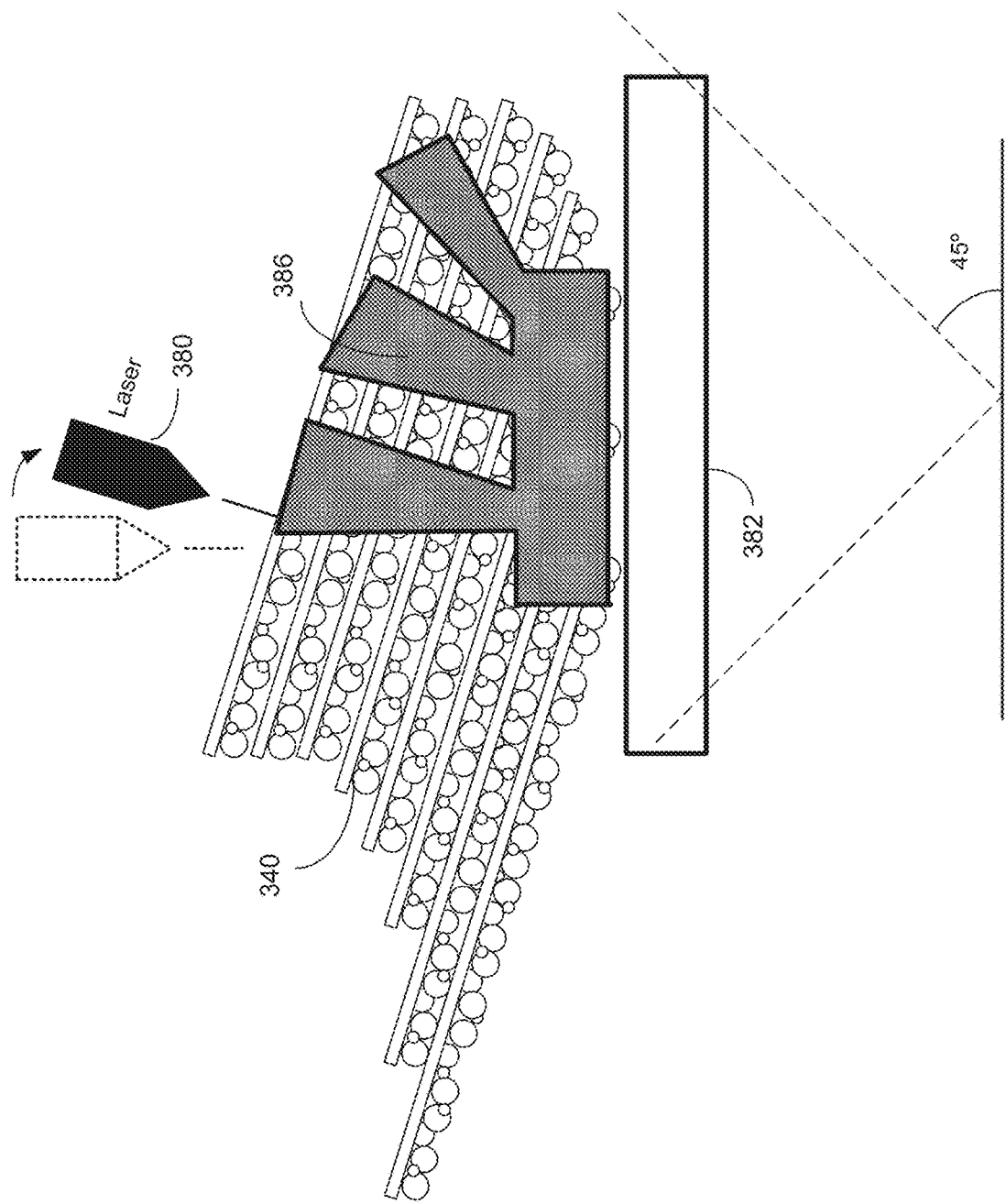
FIG. 23 is a view of a workpiece during an additive manufacturing operation using the sheet of film of FIG. 19 in still another different configuration.

FIG. 23 illustrates another configuration of layers of film 340 that shows that the film 340 must not necessarily be parallel to the work platform 382 when for various reasons, such as layer orientation with respect to the finished workpiece 386 or when even with the informal support structure, the pooling dynamics dictate a different orientation. As illustrated, the laser 380 may also be oriented to be perpendicular to the work platform 382 or the film 340, although other orientation angles may also be supported, depending on the requirements for forming the workpiece 386.

Figure 24:
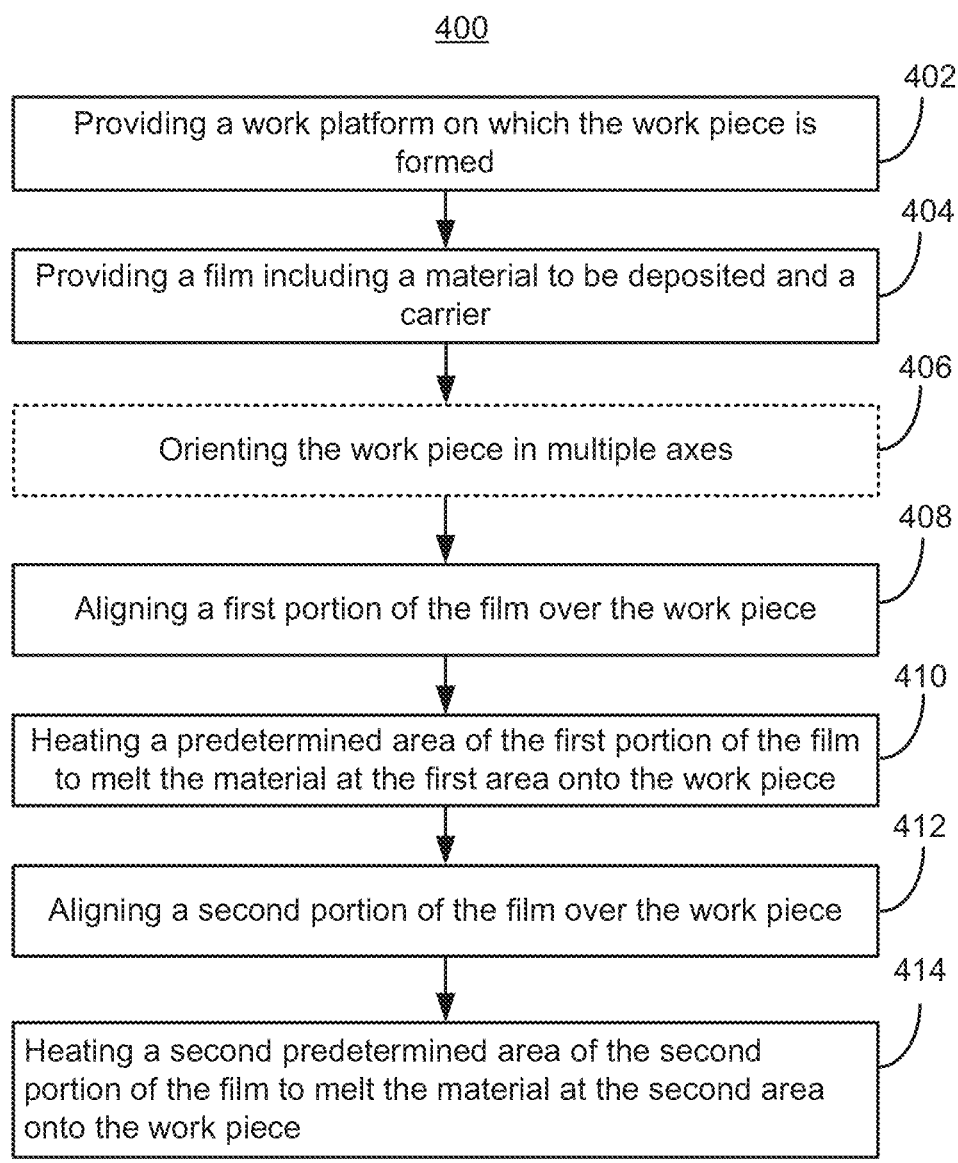
FIG. 24 is a flowchart of a method of manufacturing a workpiece.

FIG. 24 is a flowchart of a method 400 of depositing material in the form of a powdered metal onto a workpiece. At block 402, a work platform 206, 308, 382 is provided as part of a machine 100. At block 404, a film 204, 310, 340 is provided at the work platform 206, 308, 382 and/or a workpiece 312, 386. The film 204, 310, 340 is made of at least a carrier 262 or carrier layer 250, etc., and the material to be deposited, such as a powdered metal. 252, 264, 344.

Optionally, at block 406, the work platform 206, 308, 382 and/or a laser 200, 303, 380 may be oriented in two or more axes, including 5 axes associated with the capabilities of the machine 100. At block 408, a first portion of the film 204, 310, 340 may be aligned over the work platform 206, 308, 382 or the workpiece 312, 386. As discussed above, the film 204, 310, 340 may be in many forms, including, but not limited to, a flexible roll or a sheet of various shapes. The first portion of the film may be any area of the film 204, 310, 340 that has not been used previously, whether a new area or one that is adjacent or even behind an already used portion.

At block 410, a predetermined area of the first portion may be heated using the laser 200, 303, 380 so that the material, such as powdered metal attached to the film 204, 310, 340 is melted onto the workpiece 312, 386 or in the case of an initial layer, onto the work platform 206, 308, 382 itself. The carrier 242, 262, 342, etc., may be vaporized in the process.

At block 412, the process may be repeated by aligning a second portion of the film 204, 310, 340 over the workpiece 312, 386 and at block 414 melting a second predetermined area of the film to create another layer of material on the workpiece 312, 386. The steps of repositioning the film 204, 310, 340 and/or the work platform 206, 308, 382 may be repeated as many times as necessary to complete the workpiece 312, 386.

Intermixed with these additive steps may be selective subtractive steps using the machine 100 with various tools discussed above to drill, shape, or pattern either the workpiece 312, 386 developed through additive steps or to an initial object to which additive layers have be attached, or both.

By allowing a combination of additive and subtractive processes on a workpiece, particularly on the same machine 100, more complex parts can be completed in a timelier manner. Beyond that, the use of a film 204, 310, 340 to transport and align the additive material, such as a powdered metal, with the workpiece 312, 386 improves the ability to make complex shapes while reducing the number of parasitic support structures that require later secondary machining operations for removal. The film 204, 310, 340 allows positioning the additive material at angles not possible with loose powdered metals. Further, whether retained on a ribbon of film or removed via a solvent or heat, the unused powdered metal is much easier to remove and recycle compared to loose powdered metals and greatly enhances the clean-up and reconfiguration of the machine 100 for different tools or alloys.

All references, including publications, patent applications, and patents, cited herein are hereby incorporated by reference. The description of certain embodiments as "preferred" embodiments, and other recitation of embodiments, features, or ranges as being preferred, is not deemed to be limiting, and the claims are deemed to encompass embodiments that may presently be considered to be less preferred. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary embodiments is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. The description herein of any reference or patent, even if identified as "prior," is not intended to constitute a concession that such reference or patent is available as prior art against the present disclosure.

What is claimed is:

1. A machine comprising:
    a controller;

a work platform capable of moving in a plurality of dimensions responsive to instructions from the controller;

a laser proximate to the work platform that operates according to instructions from the controller;

a film including including an additive material, a carrier, and a plurality of patterns of the additive material selected to melt and be removed from the film when heated by the laser, wherein: a workpiece attached to the work platform is formed by fusing successive layers of the plurality of patterns as a result of the additive material from each pattern of the plurality of patterns being melted via heating by the laser, the carrier coupled to the additive material, the carrier comprises a sacrificial layer and the additive material is adhered to the sacrificial layer using one of an adhesive or a static charge, and a portion of the sacrificial layer coupled to each pattern of the plurality of patterns is configured to be destroyed or removed from the film when the patterns are heated by the laser; and a transport assembly having a three axis mechanism configured to move the film longitudinally in a direction of travel to allow a first pattern of the plurality of patterns to be melted by the laser, and, in response to instructions from the controller, to rewind the film to move the film opposite of the direction of travel and to reposition the film laterally over the workpiece using the three axis mechanism to allow a second pattern of the plurality of patterns to be melted by the laser, the second pattern being laterally parallel or extending less far in the direction of travel than the first pattern and is melted by the laser after the first pattern.

2. The machine of claim 1, wherein the film comprises a metal additive material provided as a foil.

3. The machine of claim 1, wherein the carrier includes first and second sacrificial layers, and the additive material is disposed between the first and second sacrificial layers.

4. The machine of claim 3, wherein the carrier further includes a third sacrificial layer, and a second additive material is disposed between the second and third sacrificial layers.

5. The machine of claim 4, wherein the second additive material is different than the additive material.

6. The machine of claim 1, wherein the additive material is embedded in the carrier.

7. The machine of claim 1, wherein the transport assembly comprises a source reel and a take-up reel operatively coupled to the controller and configured to progressively feed the film to the workpiece in response to instructions from the controller.

8. The machine of claim 1, wherein the transport assembly is configured to deliver the film in one of a plurality of orientations responsive to instructions from the controller.

9. The machine of claim 1, wherein the controller is configured to utilize information about previous use of the film and to direct the transport assembly to reposition or rewind the film to an unused portion for a subsequent melting operation.

10. The machine of claim 1, wherein the carrier is paper or plastic based and further comprises reinforced edges configured for use in moving and aligning the film.

11. The machine of claim 1, wherein individual sheets of film remain on the work platform during the fusing of successive layers of the patterns and portions of the carrier that are not exposed to the laser act as a support for the workpiece.

12. A method of depositing an additive material to form a workpiece on a work platform that is configured to move in a plurality of dimensions responsive to instructions from a controller, the method comprising:

providing a film that includes the additive material selected to melt when heated by a laser;

aligning a first portion of the film over the workpiece using a transport assembly having a three axis mechanism and controlled by the controller, the transport assembly configured to move the film longitudinally in a direction of travel;

heating a predetermined area of the first portion of the film with the laser causing the additive material at the predetermined area to melt onto the workpiece, wherein the laser is located proximate to the work platform, and the predetermined area defining a first pattern;

protecting the predetermined area from oxidation during the heating;

rewinding the film to move the film opposite of the direction of travel and repositioning the film laterally over the workpiece using the three axis mechanism to align a second portion of the film over the workpiece, the second portion of the film being laterally parallel or extending less far in the direction of travel than the first portion; and heating a second predetermined area of the second portion of the film causing the additive material at the second predetermined area to melt onto the workpiece, the second predetermined area defining a second pattern, wherein: the workpiece on the work platform is formed by fusing a plurality of patterns of the additive material as a result of the additive material from each pattern of the plurality of patterns being melted via heating by the laser, the film comprises a carrier coupled to the additive material, the carrier comprises a sacrificial layer and the additive material is adhered to the sacrificial layer using one of an adhesive or a static charge, and a portion of sacrificial layer adhered to each pattern of the plurality of patterns is configured to be destroyed or removed from the film when the plurality of patterns of additive material are heated by to the laser.

13. The method of claim 12, wherein providing the film comprises providing a metal additive material as a sheet of foil.

14. The method of claim 12, wherein providing the film comprises providing the film as one or more semi-rigid sheets having a carrier with the additive material adhered to the carrier.

15. The method of claim 12, wherein the first portion and the second portion of the film are separate sheets of film that each are planar in shape, and wherein aligning the second portion comprises placing the second portion in parallel with the first portion.

16. The method of claim 12, wherein aligning the second portion of the film comprises aligning an unused area of film containing the predetermined area of the first portion.

17. A device comprising:

a controller;

a work platform movable in multiple-axes responsive to instructions from the controller;

a laser operated by the controller and moveable in at least two axes proximate to the work platform responsive to instructions from the controller;

a film including an additive material made of metal, a carrier, and a plurality of patterns of the additive material selected to melt and be removed from the film when heated by the laser; and a transport assembly having a three axis mechanism and configured to move the film longitudinally in a direction of travel to allow a first pattern of the plurality of patterns to be melted by the laser, and, in response to instructions from the controller, to rewind the film to move the film opposite of the direction of travel and to reposition the film laterally over the workpiece using the three axis mechanism to allow a second pattern of the plurality of patterns to be melted by the laser, the second pattern being laterally parallel or extending less far in the direction of travel than the first pattern and melted by the laser after the first pattern, wherein: a workpiece coupled to the work platform is formed by layers of patterns of the plurality of patterns successively deposited by melting the additive material with the laser, the film comprises a carrier coupled to the additive material, the carrier comprises a sacrificial layer and the additive material is adhered to the sacrificial layer using one of an adhesive or a static charge, and a portion of the sacrificial layer coupled to each pattern of the plurality of patterns is configured to be destroyed or removed from the film when the plurality of patterns are heated by the laser.

18. The device of claim 17, wherein the transport assembly includes a source reel and a take-up reel that are each driven to move the film across the workpiece.

19. The device of claim 17, further comprising a tool for selectively removing material from the workpiece.

* * * * *